United States Patent
Muzychka et al.

(10) Patent No.: US 12,264,638 B2
(45) Date of Patent: Apr. 1, 2025

(54) NOZZLE ASSEMBLY FOR USE WITH A PROPULSION SYSTEM

(71) Applicant: Gulfstream Aerospace Corporation, Savannah, GA (US)

(72) Inventors: Derek Muzychka, Savannah, GA (US); Donald Freund, Savannah, GA (US); Andrew Clemens, Savannah, GA (US); John Louis, Savannah, GA (US); Joseph Gavin, Savannah, GA (US); Till Gerhardt, Savannah, GA (US); William Mcfarland, Savannah, GA (US); Benjamin Walke, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

(21) Appl. No.: 18/307,162

(22) Filed: Apr. 26, 2023

(65) Prior Publication Data

US 2024/0125286 A1 Apr. 18, 2024

Related U.S. Application Data

(60) Provisional application No. 63/363,823, filed on Apr. 29, 2022.

(51) Int. Cl.
*F02K 1/09* (2006.01)
*B64C 7/02* (2006.01)
(Continued)

(52) U.S. Cl.
CPC ............. *F02K 1/763* (2013.01); *B64C 7/02* (2013.01); *F02K 1/72* (2013.01); *G06F 1/1684* (2013.01);
(Continued)

(58) Field of Classification Search
CPC ..... F02K 1/11; F02K 1/06; F02K 1/09; F02K 1/10; B64D 2033/026
See application file for complete search history.

(56) References Cited

U.S. PATENT DOCUMENTS 2,770,994 A * 11/1956 Kunz ................. G10H 3/20
984/372
3,044,258 A * 7/1962 Carlton ............. F02K 1/1261
239/265.33

(Continued)

*Primary Examiner* — Gerald L Sung
(74) *Attorney, Agent, or Firm* — Lorenz & Kopf, LLP

(57) ABSTRACT

A nozzle assembly includes a sleeve defining a pathway, the sleeve disposed within a nacelle. The pathway and an internal surface of the nacelle guides a mass flow from an engine to an exit of the propulsion system. The sleeve is configured to move between a forward position an aft position within the nacelle aft of the engine. The sleeve has a protruding portion that extends towards a center of the pathway and that defines a smallest internal diameter of the sleeve. The sleeve includes a plurality of sleeve segments that are longitudinally aligned and circumferentially arranged to form the sleeve. The sleeve segments are configured to move circumferentially closer as the sleeve moves in a first direction within the nacelle and to move circumferentially further apart as the sleeve moves in a second direction within the nacelle. An actuator is coupled with, and is configured to move the sleeve.

20 Claims, 18 Drawing Sheets

(51) Int. Cl.
*F02K 1/72* (2006.01)
*F02K 1/76* (2006.01)
*G06F 1/16* (2006.01)
*G06V 40/12* (2022.01)
*G06V 40/13* (2022.01)

(52) U.S. Cl.
CPC ...... *G06V 40/1318* (2022.01); *G06V 40/1324* (2022.01); *G06V 40/1359* (2022.01); *G06V 40/1382* (2022.01); *F05D 2220/323* (2013.01)

(56) References Cited

U.S. PATENT DOCUMENTS

| | | | | |
|---|---|---|---|---|
| 3,599,873 | A * | 8/1971 | Williams | F02K 1/1261 239/265.39 |
| 3,814,325 | A * | 6/1974 | McCardle, Jr. | F02K 1/1261 60/771 |
| 2020/0025022 | A1 | 1/2020 | Tersmette et al. | |

* cited by examiner

NOZZLE ASSEMBLY FOR USE WITH A PROPULSION SYSTEM

CROSS-REFERENCE TO RELATED APPLICATION

This application claims the benefit of U.S. Provisional Application No. 63/363,823, filed Apr. 29, 2022, which is hereby incorporated herein by reference in its entirety.

TECHNICAL FIELD

The present invention relates generally to propulsion systems, and more particularly to a nozzle assembly for use with an aircraft propulsion system.

BACKGROUND

A supersonic aircraft is required to operate at three different flight regimes. It has to operate sub-sonically, accelerating from a standstill to take-off and then to a climb out. Then it has to operate transonically, accelerating up to, and just through, the local speed of sound. Finally, it has to operate supersonically, accelerating from just above the local speed of sound up to its supersonic cruising speed.

For each flight regime, there is a corresponding desirable or optimal nozzle configuration, one that results in a highest or relatively highest achievable nozzle efficiency. During the first flight regime (take-off and climb out), the highest level of nozzle efficiency is achieved when the nozzle has a converging configuration such that the nozzle throat is collocated with the nozzle exit plane. During the second flight regime (transonic phase), the highest level of nozzle efficiency is achieved when the nozzle has a relatively small converging/diverging configuration (i.e., where the ratio of the exit plane cross-sectional area to the nozzle throat cross-sectional area is slightly greater than one). Finally, during the third flight regime (supersonic phase), the highest level of nozzle efficiency is achieved when the nozzle has a relatively large converging/diverging configuration (i.e., where the ratio of the exit plane cross-sectional area to the nozzle throat cross-sectional area is substantially greater than one).

It is desirable for the nozzle to operate throughout all flight regimes at peak efficiency. Downward departures from peak efficiency will adversely impact the propulsion system's specific fuel consumption (SFC) which, in turn, will diminish the range that the aircraft can travel on a given amount of fuel. When any one of the three nozzle configurations described above are employed during any of the flight regimes at which that nozzle configuration provides less than peak efficiency (e.g., operating the nozzle with a converging configuration during the supersonic phase of a flight), it will result in an undesirable diminution in aircraft range or thrust.

Accordingly, it is desirable to provide a nozzle assembly that has a varying geometry to provide relatively high or peak nozzle efficiency at each flight regime as the aircraft transitions from one flight regime to another. Furthermore, other desirable features and characteristics will become apparent from the subsequent summary and detailed description considered in conjunction with the accompanying drawings and the foregoing technical field and background.

BRIEF SUMMARY

Various non-limiting embodiments of a nozzle assembly for a propulsion system are disclosed herein. The propulsion system includes an engine that is configured to produce a mass flow.

In a first non-limiting embodiment, the nozzle assembly includes, but is not limited to, a nacelle. The nozzle assembly further includes, but is not limited to, a sleeve that is mounted within the nacelle downstream of the engine. The sleeve is configured to move between a forward position and an aft position within the nacelle and further configured to receive the mass flow from the engine and to guide the mass flow to an exit of the propulsion system. The sleeve is comprised of a plurality of sleeve segments. Each sleeve segment of the plurality of sleeve segments is aligned longitudinally and is disposed in a circumferential arrangement to form the sleeve. The nozzle assembly further includes, but is not limited to, a plurality of guides. Each guide of the plurality of guides is coupled with a sleeve segment of the plurality of sleeve segments. Each guide is configured to direct a movement of each sleeve segment as the sleeve moves between the forward position and the aft position. The nozzle assembly still further includes, but is not limited to, an actuator that is coupled with the sleeve and that is configured to move the sleeve between the forward position and the aft position. An internal surface of each sleeve segment cooperates with one another to define a pathway that guides the mass flow through the sleeve. A circumferential distance between a portion of each sleeve segment varies as the sleeve moves between the forward position and the aft position. The pathway together with an internal surface of the nacelle has a longitudinal contour that varies as the sleeve moves between the forward position and the aft position. The pathway has a lateral cross-sectional area that varies as the sleeve moves between the forward position and the aft position.

In another non-limiting embodiment, the nozzle assembly includes, but is not limited to, a nacelle. The nozzle assembly further includes, but is not limited to, a sleeve that is mounted within the nacelle downstream of the engine. The sleeve is configured to move between a forward position and an aft position within the nacelle and further configured to receive the mass flow from the engine and to guide the mass flow to an exit of the propulsion system. The sleeve is comprised of a plurality of sleeve segments. Each sleeve segment of the plurality of sleeve segments is aligned longitudinally and is disposed in a circumferential arrangement to form the sleeve. The nozzle assembly further includes, but is not limited to, a plurality of guides. Each guide of the plurality of guides is coupled with a sleeve segment of the plurality of sleeve segments. Each guide is configured to direct a movement of each sleeve segment as the sleeve moves between the forward position and the aft position. The nozzle assembly still further includes, but is not limited to, an actuator that is coupled with the sleeve and that is configured to move the sleeve between the forward position and the aft position. An internal surface of each sleeve segment cooperates with one another to define a pathway that guides the mass flow through the sleeve. A circumferential distance between a portion of each sleeve segment varies as the sleeve moves between the forward position and the aft position. The pathway together with an internal surface of the nacelle has a longitudinal contour that varies as the sleeve moves between the forward position and the aft position. The pathway has a lateral cross-sectional area that varies as the sleeve moves between the forward position and the aft position. The plurality of guides is configured to direct a forward portion of each sleeve segment in a first direction and to direct an aft portion of each sleeve segment in a second direction.

In another non-limiting embodiment, the nozzle assembly includes, but is not limited to, a nacelle. The nozzle assembly further includes, but is not limited to, a sleeve that is mounted within the nacelle downstream of the engine. The sleeve is configured to move between a forward position and an aft position within the nacelle and further configured to receive the mass flow from the engine and to guide the mass flow to an exit of the propulsion system. The sleeve is comprised of a plurality of sleeve segments. Each sleeve segment of the plurality of sleeve segments is aligned longitudinally and is disposed in a circumferential arrangement to form the sleeve. The nozzle assembly further includes, but is not limited to, a plurality of guides. Each guide of the plurality of guides is coupled with a sleeve segment of the plurality of sleeve segments. Each guide is configured to direct a movement of each sleeve segment as the sleeve moves between the forward position and the aft position. The nozzle assembly still further includes, but is not limited to, an actuator that is coupled with the sleeve and that is configured to move the sleeve between the forward position and the aft position. An internal surface of each sleeve segment cooperates with one another to define a pathway that guides the mass flow through the sleeve. A circumferential distance between a portion of each sleeve segment varies as the sleeve moves between the forward position and the aft position. The pathway together with an internal surface of the nacelle has a longitudinal contour that varies as the sleeve moves between the forward position and the aft position. The pathway has a lateral cross-sectional area that varies as the sleeve moves between the forward position and the aft position. The plurality of guides is configured to direct a forward portion of each sleeve segment and an aft portion of each sleeve segment in parallel directions.

BRIEF DESCRIPTION OF THE DRAWINGS

The present invention will hereinafter be described in conjunction with the following drawing figures, wherein like numerals denote like elements.

DETAILED DESCRIPTION

Figure 1:
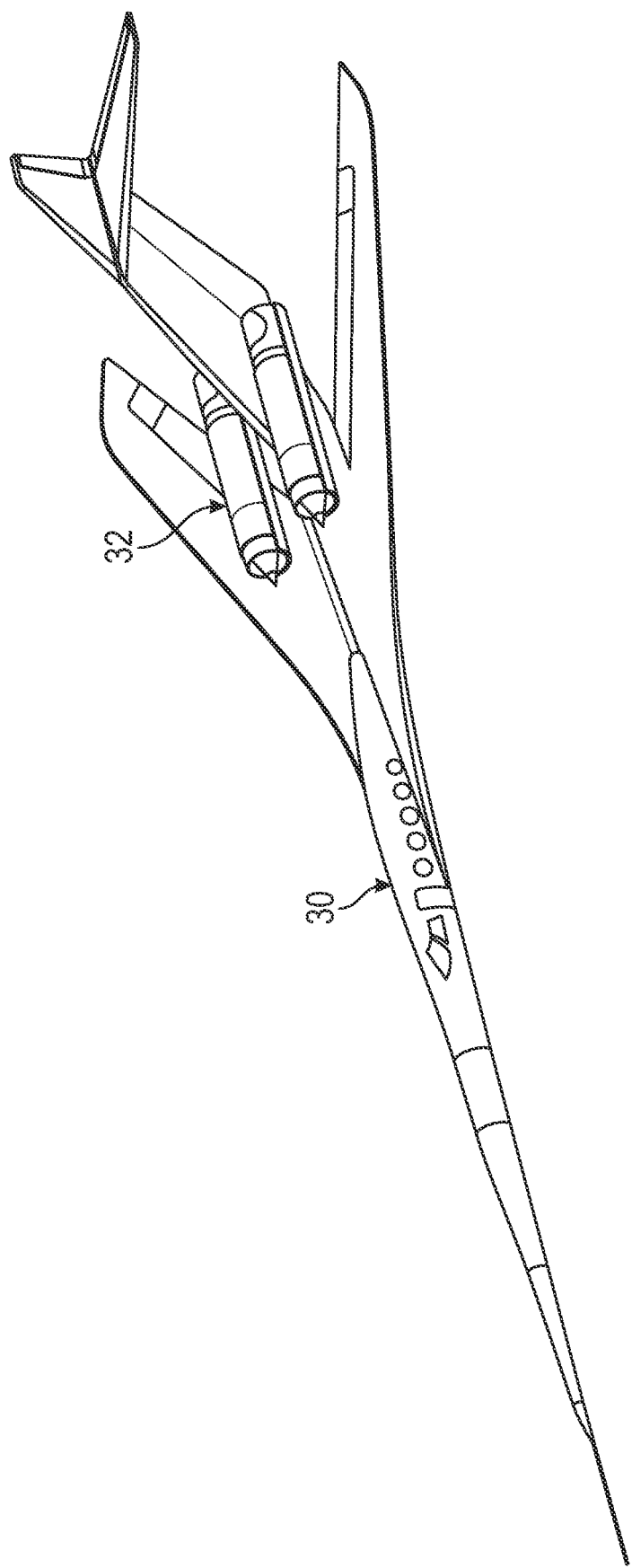
FIG. 1 is a side view illustrating an aircraft equipped with a propulsion system that is suitable for use with various non-limiting embodiments of a nozzle assembly made in accordance with the teachings disclosed herein.

The following detailed description is merely exemplary in nature and is not intended to limit the invention or the application and uses of the invention. Furthermore, there is no intention to be bound by any theory presented in the preceding background or the following detailed description.

An improved nozzle assembly for use with a propulsion system is disclosed herein. The nozzle assembly of the present disclosure has a variable geometry that allows it to assume multiple configurations and, correspondingly, to provide desirable/optimal nozzle efficiency at multiple flight regimes, including, but not limited to, the three flight regimes discussed above. At the heart of the nozzle assembly disclosed herein is a sleeve that fits within the propulsion system's nacelle aft of the engine. An internal surface of the sleeve forms a pathway that the mass flow follows as it is expelled from the engine's exit and moves towards the nacelle's exit. The sleeve has an annular or tube-like configuration. In a longitudinal cross-section through the sleeve, the sleeve has a profile that includes a protruding portion that extends in an inward direction towards a centerline of the pathway. This protruding portion creates a local region of reduced cross-sectional area of the pathway.

The sleeve is configured to move longitudinally (translate) within the nacelle. Movement of the sleeve longitudinally through the nacelle causes the protruding portion/local region of reduced cross-sectional area of the pathway to move in a corresponding fashion. This ability to control the longitudinal location of the local region of reduced cross-sectional area permits the nozzle assembly to assume the different configurations needed to obtain the desired/optimal nozzle efficiencies associated with each of the three flight regimes discussed above. Movement of the sleeve to a desired longitudinal position within the nacelle is determined and controlled by a controller (e.g., a micro-controller, an electronic controller, a computer, and the like) that is operatively coupled with an actuator such as a motor, that in turn, is configured to move the sleeve.

The aft portion of a nacelle housing the sleeve has an externally tapered configuration known in the art as a "boat tail". This externally tapered configuration of the nacelle yields an internal surface of the nacelle that likewise has a tapered configuration in the direction of mass flow (i.e., in the downstream direction). This tapered configuration requires the sleeve to circumferentially contract as the sleeve moves from a forward position within the nacelle to an aft position within the nacelle. Conversely, the sleeve must circumferentially expand as the sleeve moves from the aft position within the nacelle to the forward position within the nacelle. To achieve circumferential contraction and expansion, the sleeve is comprised of a plurality of sleeve segments that are arranged circumferentially to form the annular or tube-like configuration described above. Each sleeve segment includes a respective portion of the protruding portion, and each sleeve segment is arranged with respect to one another such that their respective portions of the protruding portion are circumferentially aligned to form a composite protruding portion (e.g., a throat).

To accommodate the differing cross-sectional areas through which the sleeve must pass at it moves longitudinally upstream and downstream through the nacelle, in at least one embodiment, each sleeve segment of the plurality of sleeve segments is configured, shaped and/or dimensioned so as to be entirely or partially circumferentially spaced apart from one another at one longitudinal end of the pathway and to be entirely or partially circumferentially adjacent to one another at an opposite longitudinal end of the pathway. This dimensioning and lateral spatial arrangement of each sleeve segment with respect to its neighboring sleeve segment is what facilitates the circumferential expansion and contraction of the sleeve as it moves longitudinally through the nacelle.

As the sleeve moves from one longitudinal position to another longitudinal position within the nacelle, and as the individual sleeve segments of the sleeve move partially or entirely apart from one another, gaps form between the sleeve segments. Further, because of limitations associated with manufacturing capabilities, there is a gap between a leading edge of each sleeve segment of the sleeve and the inner surface of the nacelle. Further still, in embodiments of the nozzle assembly where the individual sleeve segments employ track followers to follow tracks that are coupled with, or that are defined within, the inner surface of the nacelle and that are designed to guide the movement of the individual sleeve segments, such tracks also constitute gaps. These gaps, if left unchecked, would form pathways that would siphon off and/or redirect portions of the mass flow and result in losses that would reduce the efficiency of nozzle assembly. Accordingly, the nozzle assembly includes a plurality of seals to close off the above-described gaps to prevent such losses.

Two embodiments of the nozzle assembly are disclosed herein. Although only two embodiments are discussed and disclosed herein, it should be understood that other embodiments may also be employed without departing from the teachings disclosed herein.

In one embodiment, the individual sleeve segments are guided in their longitudinal movement through the nacelle by tracks that are coupled with, or that are defined in, the inner surface of the nacelle. Each individual sleeve segment has at least one track follower that is configured to engage the tracks and to guide the longitudinal movement of each segment. In this embodiment, the tracks followed by the track followers are longitudinally straight and aligned with the inner surface of the nacelle. They guide the sleeve segment as it moves back and forth longitudinally within the nacelle and keep the longitudinal orientation of each individual sleeve segment constant, effectively repositioning and re-dimensioning the projecting portion and the local reduced cross-sectional area as the sleeve moves without altering its longitudinal contours. In this embodiment, when the sleeve is in a full-forward position, the projecting portion is at its longitudinally forward-most position and the locally reduced cross-sectional area of the pathway has a cross-sectional area that is equal to a cross-sectional area of the exit plane due to the circumferential expansion of the sleeve at this longitudinal location of the nacelle. This configuration results in the pathway, together with an internal surface of the nacelle downstream of the pathway, having a converging configuration that is most efficient during the first flight regime when the aircraft is taking-off from a runway and climbing out of the airspace surrounding the airport. In addition, with respect to this particular embodiment (illustrated in FIGS. 16 through 22 and discussed in detail below), this converging configuration, while not ideally suited for the second flight regime is, nevertheless optimal during the second flight regime when the aircraft is flying at transonic speeds because it avoids creating shocks and flow separation within the nozzle assembly. When the sleeve of this first embodiment is moved to its aft-most position, the locally reduced cross-sectional area of the pathway has a smaller cross-sectional area than the cross-sectional area of the exit plane due to the circumferential contraction of the sleeve at this longitudinal location of the nacelle. This configuration results in the pathway having a converging-diverging configuration that is most efficient during the third flight regime when the aircraft is flying at supersonic speeds. Although this embodiment is described as being suitable for use with the take-off, the transonic, and the supersonic flight regimes, it should be understood that the sleeve can be positioned at any suitable longitudinal location within the nacelle aft of the engine to optimize nozzle performance during any other/additional flight regimes that the aircraft may operate within. In this embodiment, the sleeve remains at, or forward of, the exit plane of the nacelle at all times.

In another embodiment, the tracks followed by the path followers have a curvature that is configured to cause the sleeve to vary its geometry in a manner that best accommodates all three flight regimes. In this other embodiment, when the sleeve is in its aft-most position, an aft portion of the sleeve partially extends downstream of the nacelle's exit plane and by doing so, an aft end of the sleeve becomes the propulsion system's exit plane. In this aft-most position, the tracks cause the individual sleeve segments to assume a position that results in the locally reduced cross-sectional area and the remaining portion of the sleeve downstream of the locally reduced cross-sectional area to have a constant cross-sectional area. This results in the pathway, together with the internal surface of the nacelle, having a converging configuration that precludes the mass flow from becoming supersonic. This configuration is the most efficient during the first flight regime when the aircraft is taking off and climbing out of the airspace surrounding the airport. When the sleeve is moved to an intermediate longitudinal position within the nacelle, the tracks cause the sleeve to reconfigure such that the locally reduced cross-sectional area is now slightly smaller than the cross-sectional area of the propulsion system's exit plane. Said another way, the narrowest portion of the sleeve contracts as the aft portion of the sleeve tilts outward. This arrangement of the sleeve results in the nozzle assembly having a minimal converging-diverging configuration. As used herein, the term "minimal converging-diverging configuration" refers to a configuration that is optimal for sustaining transonic flight. As is well known in the art, this is determined by the ratio of the total pressure (in the case of gases, also known as stagnation pressure) to the freestream static pressure (also known as ambient pressure) that the engine exhausts into. When these pressures are known, the Mach number can be determined using the following equation:

$$p/pt = [1 + M^2 \ast (\text{gam}-1)/2]^\wedge - [\text{gam}/(\text{gam}-1)]$$

Once the Mach number has been calculated using the equation above, that Mach number is plugged into the following equation to solve for the left-hand side of the equation (A/A*):

$$A/A\ast = \{[1 + M^2\ast(\text{gam}-1)/2]^\wedge[(\text{gam}+1)/(\text{gam}-1)/2]\}\ast\{[(\text{gam}+1)/2]^\wedge - [(\text{gam}+1)/(\text{gam}-1)/2]\}/M$$

"A/A*" refers to the exit area (A) divided by the throat area (A*) (also known as A9/A8). Thus, the maximum ratio suitable for transonic operation is a function of the freestream static pressure (ambient pressure) and the engine's total pressure (stagnation pressure) calculated utilizing the isentropic equations described above. A designer can select a desired Mach number for transonic flight and, being aware of the stagnation pressure at a predetermined throttle position and knowing the ambient pressure at a predetermined altitude, the designer can determine where to position the primary curve of the sleeve within the nozzle to yield the maximum ratio that will produce the desired Mach number. This minimal converging-diverging configuration yields a relatively low-thrust supersonic flow that is well suited for efficient operation during the second flight regime when the aircraft is flying at transonic speeds. The A/A* values calculated with the aforementioned method account for ideal operation, however losses in a real-world environment warrant small adjustments to the final A/A* value to achieve the optimal performance. When the sleeve is moved to a forward-most longitudinal position along the pathway, the tracks cause the sleeve to further reconfigure such that the locally reduced cross-sectional area has a smaller diameter than it did at the intermediate position. The tracks also cause the cross-sectional area of the aft portion of the sleeve to further enlarge as compared with its cross-sectional area at the intermediate position. This yields a maximum converging-diverging configuration that, in turn, yields a relatively high thrust that is well suited for efficient operation during the third flight regime when the aircraft is flying at supersonic speeds. As used herein, the term "maximum converging-diverging configuration" refers to a maximum possible ratio of the cross-sectional area of the exit plane to the cross-sectional are of the locally reduced cross-sectional area that can be achieved based on physical and structural limitations imposed by the tracks. As stated above, although this embodiment is described as being suitable for use with the take-off/climb out flight regime and the transonic flight regime and the supersonic flight regime, it should be understood that the sleeve can be positioned at any suitable location along the nacelle to optimize nozzle performance during any other/additional flight regimes that the aircraft may operate within.

In addition to ensuring peak efficiency of the nozzle at various flight regimes, another advantage derived from variable area ratio capability of the disclosed nozzle assembly is that increasing the nozzle throat area increases the fan stall margin, which allows additional fan distortion tolerance during low-speed (i.e. take-off) operation with a cross-wind or other cause of inlet distortion.

Further, increasing the nozzle throat (A8) reduces the nozzle exit velocity which is a strong driver of takeoff noise. Furthermore, ensuring a purely converging nozzle at takeoff also ensures the nozzle exit velocity does not exceed Mach 1.0 which would significantly increase the overall takeoff noise of the aircraft.

A greater understanding of the propulsion system discussed above and a method of manufacturing the propulsion system may be obtained through a review of the illustrations accompanying this application together with a review of the detailed description that follows.

FIG. 1 is a side view illustrating an aircraft 30 equipped with a propulsion system 32. Propulsion system 32 is suitable for use with various non-limiting embodiments of a nozzle assembly made in accordance with the teachings disclosed herein and discussed in detail below. Aircraft 30 is configured for flight at subsonic speeds, transonic speeds, and supersonic speeds. Propulsion system 32 is configured to provide thrust to aircraft 30 suitable to propel aircraft 30 at subsonic speeds, transonic speeds, and supersonic speeds.

Figure 2:
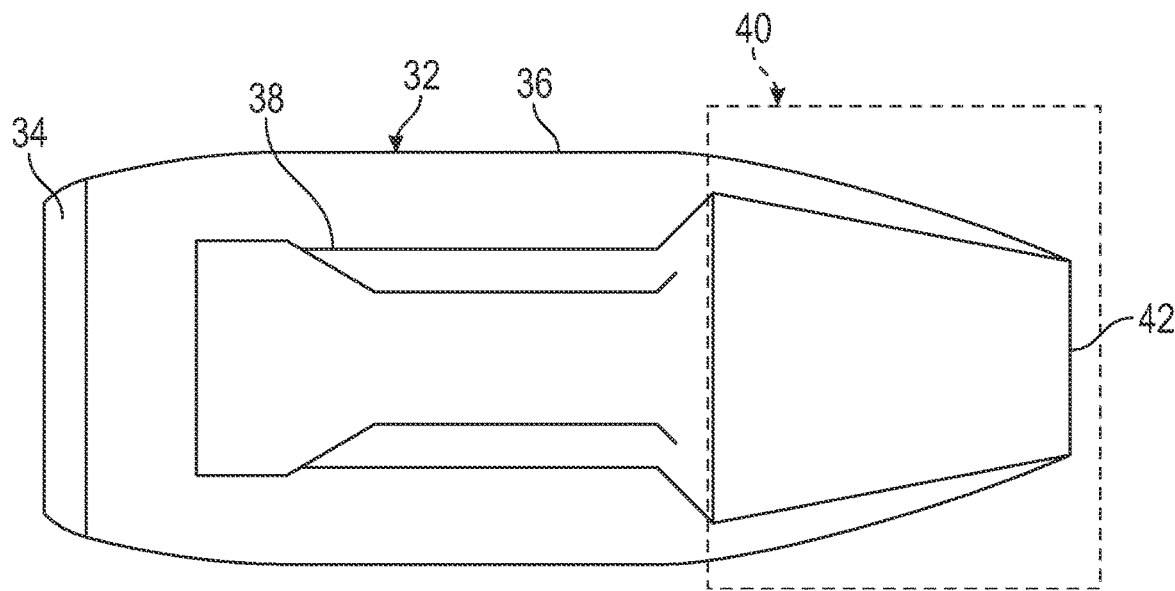
FIG. 2 is a schematic, transparent view illustrating the propulsion system employed by the aircraft of FIG. 1.

With continued reference to FIG. 1, FIG. 2 is a schematic, transparent view illustrating propulsion system 32. Propulsion system 32 includes an intake 34, a nacelle 36, an engine 38, and a nozzle assembly 40. Intake 34 is configured to capture air from the free stream air and to direct the captured air to engine 38. Engine 38 is configured to compress the captured air, to add fuel to the captured air, and to combust the captured air to generate a heated, high energy mass flow that can be used to impart thrust to aircraft 30. Engine 38 is further configured to direct the high energy mass flow downstream into nozzle assembly 40. In some embodiments, propulsion system 32 may further include one or more turbines that are driven by the high energy mass flow and which, in turn, drive fans at an upstream location within the propulsion system to generate additional thrust. Nozzle assembly 40 is configured to receive the high energy mass flow from engine 38, to guide the high energy mass flow to an exit 42 of propulsion system 32, and as discussed in detail below, to focus the high energy mass flow to generate differing amounts of thrust.

Figure 3:
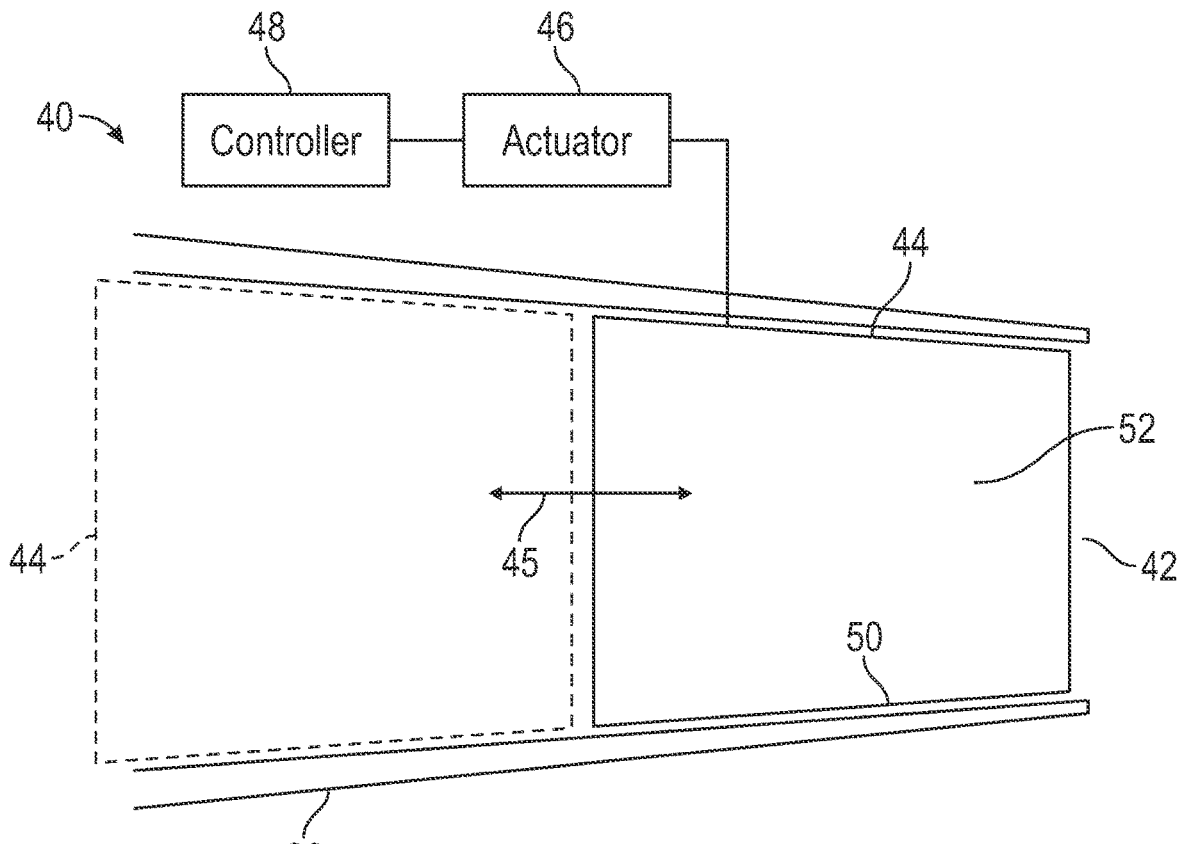
FIG. 3 is a schematic, side view illustrating the nozzle assembly employed by the propulsion system of FIG. 2.
Figure 9:
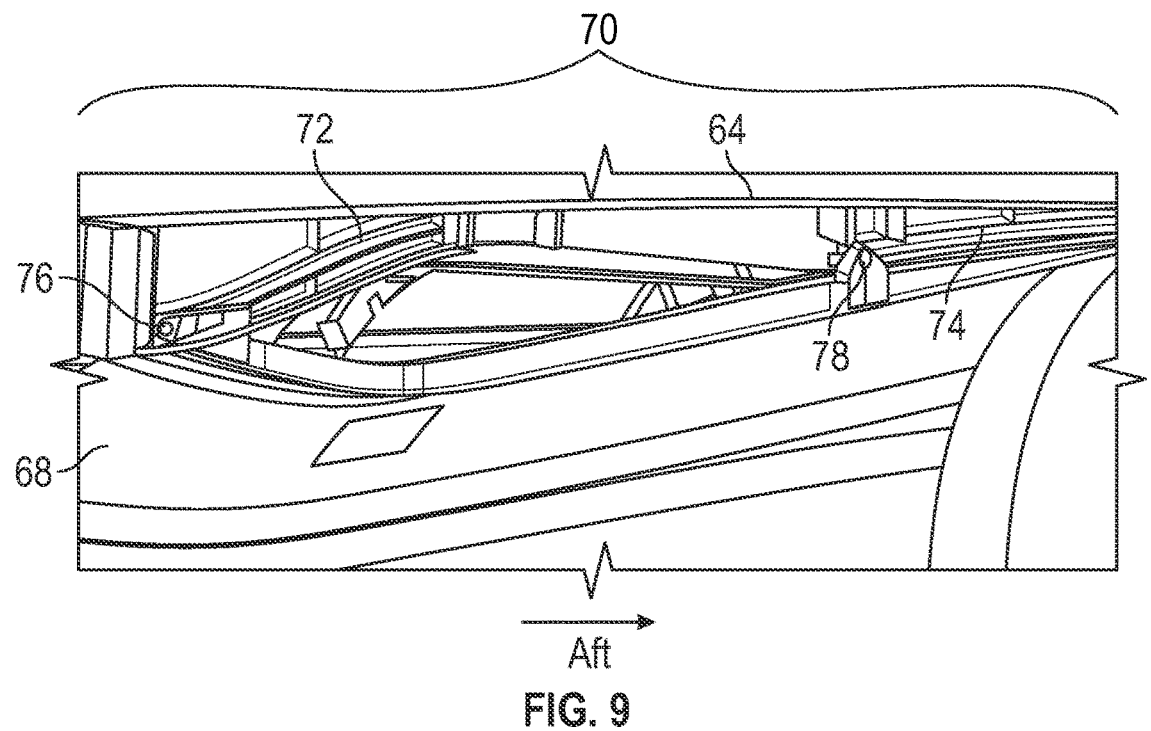
FIG. 9 is a torn-away view illustrating internal features of the first embodiment of the nozzle assembly.

With continuing reference to FIGS. 1-2, FIG. 3 is a schematic side view illustrating nozzle assembly 40 in greater detail. Nozzle assembly 40 includes a portion of nacelle 36, a sleeve 44, an actuator 46, a controller 48, and a plurality of guides which are discussed below in conjunction with the descriptions of FIGS. 9 and 20.

Sleeve 44 may be made from any material suitable for maintaining its shape/contour when exposed to a mass flow having a temperature imparted by a jet engine. Sleeve 44 is configured to move back and forth in the direction indicated by double headed arrow 45 between an aft position (shown in solid lines) and a forward position (shown in phantom lines). Sleeve 44 is comprised of an assembly of longitudinally aligned and circumferentially arranged individual sleeve segments that cooperate with one another to form an annular, tube-like structure that can conform to, or accommodate, the internal surface of nacelle 36. The individual sleeve segments are not shown in FIG. 3 but are illustrated in FIGS. 4-22. The individual sleeve segments are configured to at least partially move circumferentially with respect to one another. As sleeve 44 moves from the aft position to the forward position, the diameter and the cross-sectional area of nacelle 36 enlarges due to the frusto-conical configuration of the aft portion of nacelle 36. To accommodate this increasing diameter and cross-sectional area, the individual sleeve segments are configured to at least partially move circumferentially away from one another and to thereby at least partially expand a diameter of sleeve 44. As sleeve 44 moves from the forward position to the aft position, this phenomenon is reversed and the diameter and the cross-sectional area of nacelle 36 diminishes. To accommodate this decreasing diameter and diminishing cross-sectional area, as sleeve 44 moves downstream the individual sleeve segments are configured to at least partially move circumferentially towards one another and to thereby at least partially contract the diameter of sleeve 44.

An inner surface 50 of sleeve 44 is comprised of an amalgamation of the inner surfaces of each of the individual sleeve segments. These inner surfaces cooperate to form a pathway 52 which, together with an internal surface of nacelle 36, guides the high energy mass flow from engine 38 to exit 42. Each individual sleeve segment has a substantially identical contour that includes a primary curve in the longitudinal direction, as best illustrated in FIGS. 10-12 and 21-22. These primary curves, together, form a region of sleeve 44 that has the smallest cross-sectional area. Depending on the position of sleeve 44 and its state of expansion and contraction, this region may also constitute a throat of nozzle assembly 40. The precise configuration of pathway 52 and its ability to focus the mass flow in a manner that generates sub-sonic, transonic, and supersonic exhaust that yields corresponding levels of thrust is determined by the plurality of guides (as discussed below), the state of contraction or expansion of sleeve 44, the longitudinal location of sleeve 44 within nacelle 36 and, correspondingly, the location of the region of the smallest cross-sectional area of sleeve 44 within nacelle 36. For ease of illustration, the primary curve, the smallest cross-sectional area, and the varying configurations of pathway 52 are not illustrated in this schematic view but rather, are presented in the subsequent illustrations throughout the remainder of this disclosure.

Actuator 46 may comprise any machine or mechanism that is effective to generate and deliver force to sleeve 44 so as to cause sleeve 44 to move forward and aft within nacelle 36. In an embodiment, and without limitation, actuator 46 may comprise an electric motor. Any other type of actuator, whether now known, or hereafter invented, may be employed by nozzle assembly 40 without departing from the teachings of the present disclosure.

Controller 48 may be any type of onboard computer, controller, micro-controller, circuitry, chipset, computer system, or microprocessor that is configured to perform algorithms, to execute software applications, to execute sub-routines and/or to be loaded with and to execute any other type of computer program. Controller 48 may comprise a single processor or a plurality of processors acting in concert. In some embodiments, controller 48 may be dedicated for use exclusively with nozzle assembly 40 while in other embodiments controller 48 may be shared with other systems on board aircraft 30.

Controller 48 is operatively coupled to actuator 46 and may be communicatively coupled to other systems, controllers, and/or sensors on board aircraft 30 including, but not limited to, a primary flight control system that is configured to receive aircrew inputs indicative of a desired speed of aircraft 30. Such couplings may be effected through the use of any suitable means of transmission including both wired and wireless connections. For example, each component may be physically connected to processor 34 via a coaxial cable or via any other type of wire connection that is effective to convey signals. In the illustrated embodiment, controller 48 is directly operatively coupled with actuator 46. In other embodiments, actuator 46 may be coupled with controller 48 across a vehicle bus. In still other examples, actuator 46 may be wirelessly coupled with controller 48 via a Bluetooth connection, a WiFi connection or the like.

Being operatively coupled provides a pathway for the transmission of commands, instructions, interrogations, and other signals between controller 48 and actuator 46. Through this coupling, controller 48 may control and/or communicate with actuator 46. Actuator 46 may be configured to interface and engage with controller 48. For example, in some embodiments, actuator 46 may be configured to receive commands from controller 48 and to automatically provide information to controller 48 pertaining to the longitudinal position of sleeve 44 or to provide such information in response to an interrogation received from controller 48.

Controller 48 is configured to interact with, coordinate and/or orchestrate the activities of actuator 46 for the purpose of controlling the amount of thrust delivered by propulsion system 32. Controller 48 may be programmed and/or otherwise configured to receive information indicative of a desired speed of aircraft 30 and may be further configured to control actuator 46 to move sleeve 44 to a longitudinal position within nacelle 36 that will focus the high energy mass flow in a manner that will yield an amount of thrust suitable for propelling aircraft 30 at the desired speed. In some embodiments, in order to generate the necessary thrust, controller 48 may instruct actuator 46 to move sleeve 44 from an aft-most position to a forward-most position or vice-versa, or to any other position that is appropriate for generating an amount of thrust that corresponds with the desired speed. In a non-limiting embodiment, controller 48 may be programmed with, or may have access to, an a priori lookup table that correlates each possible longitudinal position of sleeve 44 within nacelle 36 with a corresponding amount of thrust that will be generated at each possible throttle position. In such an example, when a throttle position is selected by a member of the aircrew, controller 48 may access the lookup table and, based on the information available on the lookup table, controller 48 may instruct actuator 46 to move sleeve 44 to a longitudinal position within nacelle 36 that will cause pathway 52 to have a longitudinal and lateral configuration that is suitable for generating an amount of thrust that is consistent with the selected throttle position.

In other embodiments, sensors associated with propulsion system 32 or sensors that are located elsewhere onboard aircraft 30 may be employed that provide controller 48 with feedback relating to the amount of thrust being generated by propulsion system 32. Controller 48 may be configured to use this feedback to determine a deviation between the amount of thrust currently being generated and the amount of thrust requested by the aircrew and may be further configured to control actuator 46 to move sleeve 44 in a direction that will longitudinally reposition sleeve 44 within nacelle 36 to yield a new thrust that will reduce the deviation between the current thrust and the desired thrust. This process may repeat itself in an iterative manner until the desired thrust is obtained or until the deviation falls to below an acceptable level. In some embodiments, sensors associated with propulsion system 32 may be configured to detect the position of sleeve 44 within nacelle 36 and to deliver information to controller 48 indicative of the position of sleeve 44. In such embodiments, controller 48 may be configured to receive the information indicative of the position of sleeve 44 from the sensors and to use the information to confirm whether sleeve 44 has moved to the commanded position. In instances where controller 48 determines that sleeve 44 has not moved to the commanded position, controller 48 is configured to generate a Crew Alerting System (CAS) message and to communicate the CAS message to the aircrew. In still other embodiments, controller 48 may employ any other suitable method for controlling actuator 46 in a manner that causes propulsion system 32 to generate the thrust necessary to propel aircraft 30 at the desired speed.

In FIG. 3, although actuator 46 and controller 48 are both illustrated in a position spaced apart from nacelle 36 and sleeve 44, it should be understood that in an embodiment, actuator 46 and controller 48 may be housed in any suitable location including, but not limited to, housed within nacelle 36, mounted on sleeve 44, mounted elsewhere on propulsion system 32, housed within a pylon (not shown) or mounted to any other suitable portion of aircraft 30 without departing from the teachings of the present disclosure.

With continuing reference to FIGS. 1-3, FIG. 4 is a perspective view illustrating an embodiment of a nozzle assembly 60 made in accordance with the teachings disclosed herein. In this view, nozzle assembly 60 is presented with an exit 62 facing the viewer and oriented in a manner that permits the viewer to look upstream into an aft end of nozzle assembly 60.

Figure 4:
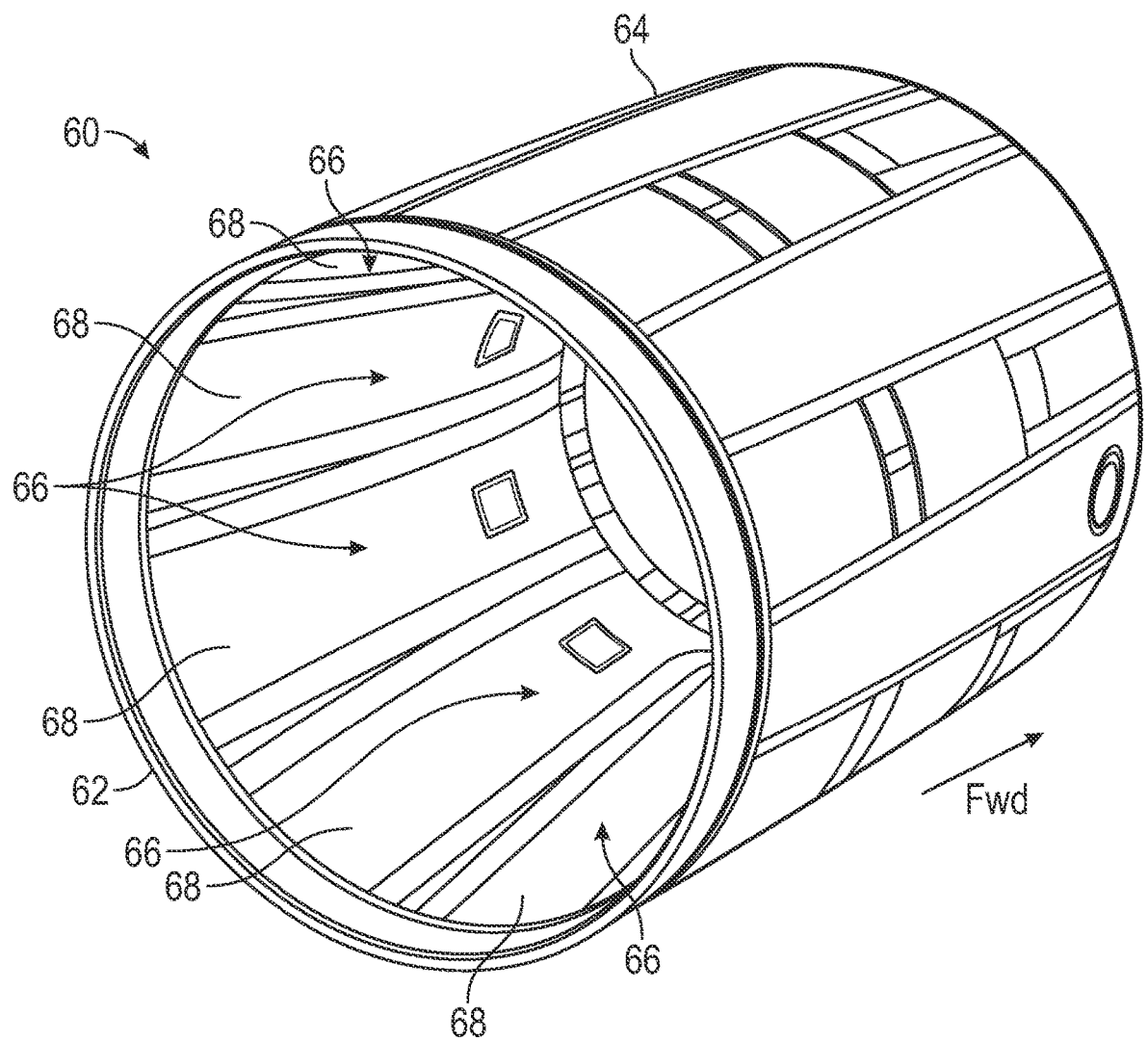
FIG. 4 is a perspective view illustrating a first embodiment of a nozzle assembly made in accordance with the teachings disclosed herein viewed in an upstream direction.

Nozzle assembly 60 includes a nacelle 64 and a sleeve 66 mounted therein and coupled in a manner that permits sleeve 66 to translate forward and aft within nacelle 64. Sleeve 66 is comprised of a plurality of individual, substantially identical, sleeve segments 68 aligned longitudinally with one another, oriented such that their longitudinal axes are aligned with a direction of the mass flow, and arranged circumferentially to form a cylindrical tube-like structure that, together with an internal surface of nacelle 64, is configured to guide the mass flow through nozzle assembly 60 to exit 62. In FIG. 4, sleeve 66 is disposed in a forward most position withing nacelle 64. In FIG. 4, the controller and the actuator of nozzle assembly 60 are not visible and may be mounted to any suitable location on the aircraft.

Figure 5:
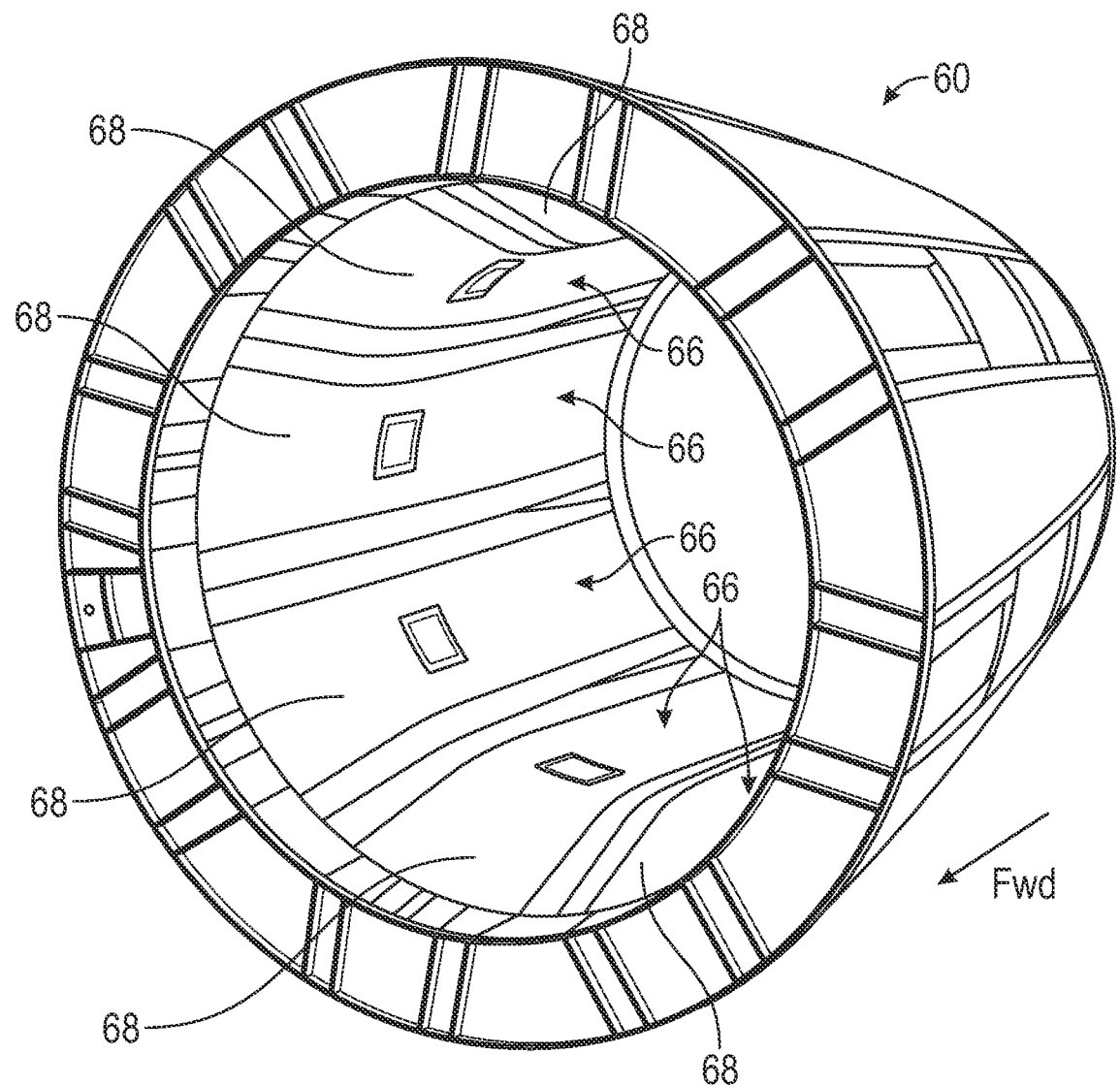
FIG. 5 is a perspective view illustrating the first embodiment of the nozzle assembly viewed in a downstream direction.
Figure 6:
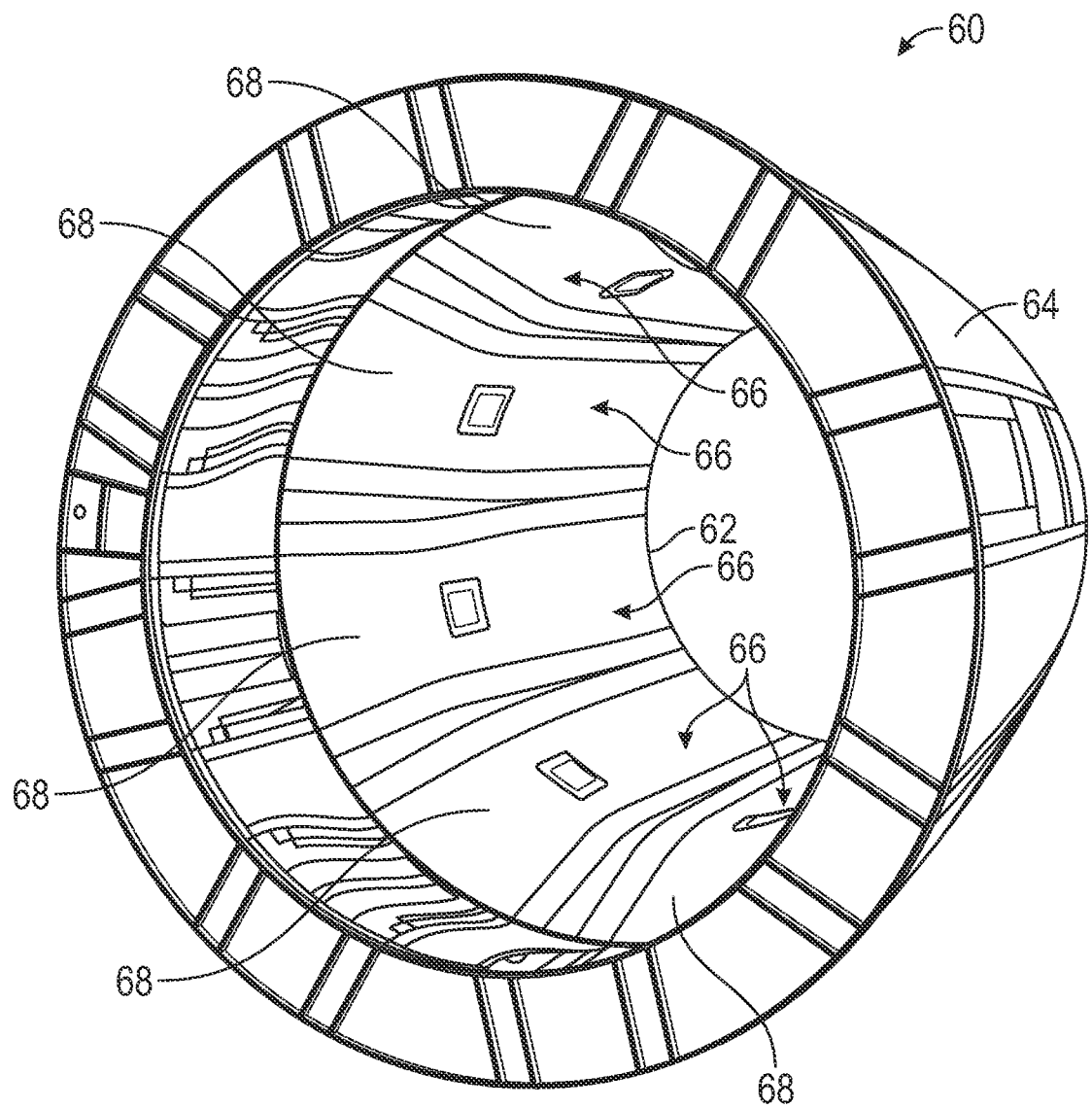
FIG. 6 is a perspective view illustrating the first embodiment of the nozzle assembly arranged in a configuration suitable for a takeoff and a landing phase of flight.

With continuing reference to FIGS. 1-4, FIG. 5 is a perspective view illustrating nozzle assembly 60 viewed in a downstream direction. In FIG. 5, sleeve 66 is again illustrated in a forward-most position. In FIG. 5, it can be observed that a forward portion of each individual sleeve segment 68 is disposed immediately adjacent to one another while an aft portion of each individual sleeve segment 68 is spaced apart from one another. This is a result of a combination of both the curvature of each sleeve segment 68 and the orientation of each sleeve segment 68, as discussed in detail below.

With continuing reference to FIGS. 1-5, FIG. 6 is a perspective view illustrating nozzle assembly 60 arranged in a configuration suitable for a takeoff and a landing phase of flight. In this configuration, sleeve 66 is disposed in its aft-most position. An aft portion of each sleeve segment 68 is now disposed immediately circumferentially adjacent to one another and a forward portion each sleeve segment 68 is now circumferentially spaced apart from one another. As discussed in detail below, this is because the plurality of guides that guide each individual sleeve segment 68 has moved an aft end of each sleeve segment 68 inboard to a greater extent than the guides have moved the forward ends of each sleeve segment 68 inboard, causing each sleeve segment 68 to, in effect, pivot its aft end inboard (in towards a center of sleeve 66) and its forward end outboard (out, away from the center of sleeve 66). When sleeve 66 is in its aft-most position within nacelle 64, an aft-most portion of sleeve 66 extends beyond an aft-most portion of nacelle 64 and therefore becomes exit 62 of propulsion system 32. In this configuration, a primary curve (see FIGS. 9-12) of each individual sleeve segment 68 forms the smallest cross-sectional area of sleeve 66. The cross-sectional area of sleeve 66 upstream of the primary curve has a diverging configuration in the upstream direction and the cross-sectional area of sleeve 66 downstream of the primary curve remains constant in the downstream direction. In this configuration, the mass flow passing through nacelle 64 follows a pathway that will converge when the mass flow initially encounters sleeve 66 and that will continue to converge until the mass flow reaches the primary curve. As the mass flow continues downstream of the primary curve, the pathway will have a constant diameter all the way to exit 62. Therefore, the mass flow will neither converge nor diverge for the remainder of its passage through sleeve 66 after moving past the primary curve. In some embodiments, the pathway may have a slightly converging configuration all the way to exit 62. In either of these configurations, the mass flow is precluded from becoming supersonic because, with sleeve 66 in the aft-most position, nozzle assembly 60 does not include a diverging portion aft of the primary curve. This configuration is well suited for taking off and for landing an aircraft because the lack of supersonic flow ensures that the noise generated by the propulsion system will be relatively low and in compliance with local ordinances and governing law.

Figure 7:
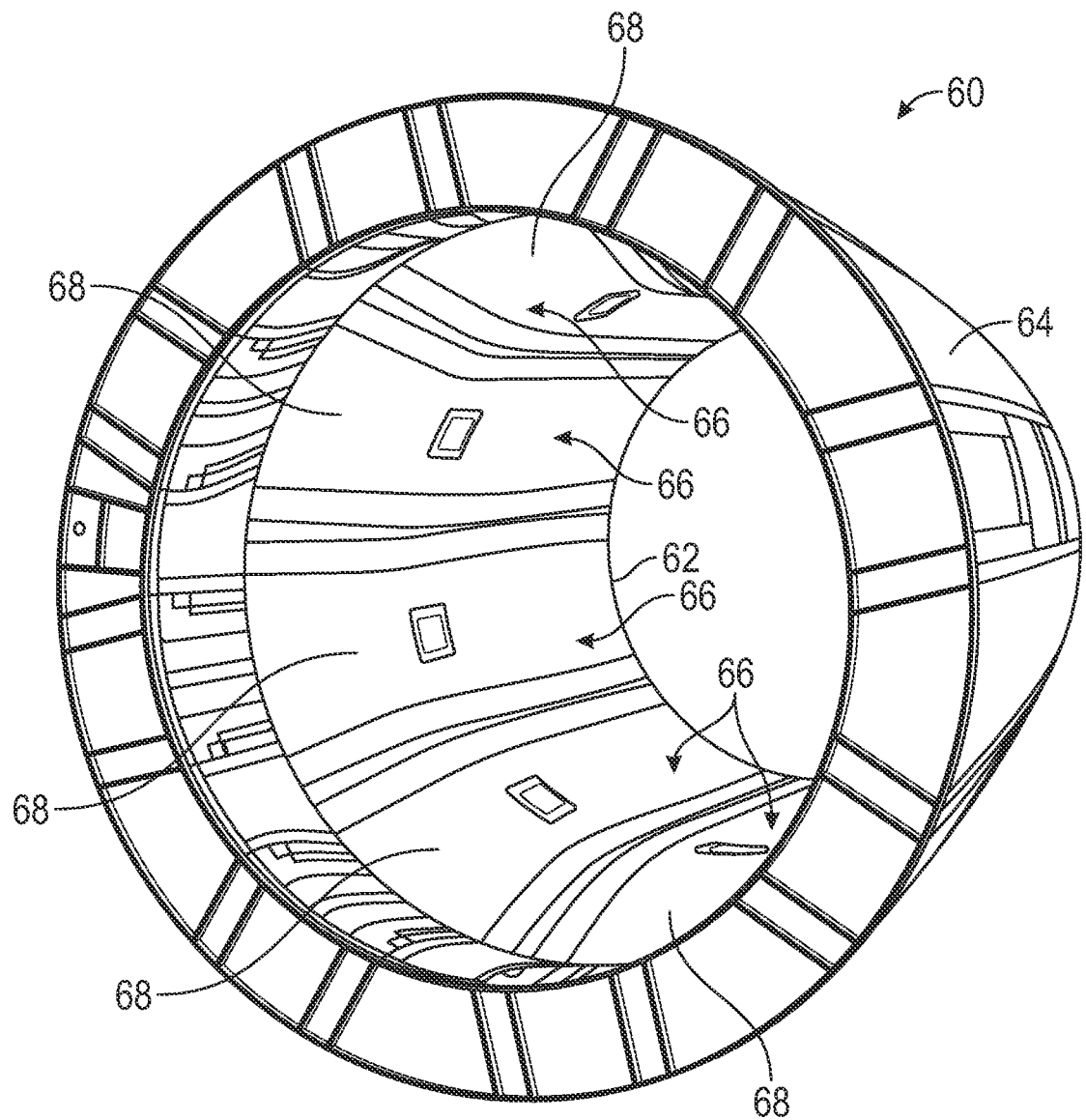
FIG. 7 is a perspective view illustrating the first embodiment of the nozzle assembly arranged in a configuration suitable for a transonic phase of flight.

With continuing reference to FIGS. 1-6, FIG. 7 is a perspective view illustrating nozzle assembly 60 arranged in a configuration suitable for a transonic phase of flight. In FIG. 7, sleeve 66 has moved partially upstream within nacelle 64 to an intermediate location. As sleeve 66 moves upstream, each sleeve segment 68 is moved by its respective guide (see FIG. 9) in a manner that alters the inboard and outboard relationship between the forward-most end and the aft-most end of each sleeve segment 68. The guide is configured to cause the aft-most end of each sleeve segment 68 to move in an outboard direction relative to the forward-most end of each sleeve segment 68, and to cause the forward-most end of each sleeve segment 68 to move in an inboard direction relative to the aft-most end of each sleeve segment 68. Throughout this pivotal movement of each sleeve segment 68, the primary curve remains the smallest cross-sectional area of sleeve 66. However, in the position/configuration illustrated in FIG. 7, there is now a slight divergence of the pathway that the mass flow follows aft of the primary curve because of the change in orientation of each sleeve segment 68. The configuration shown in FIG. 7 is referred to herein as a minimally converging-diverging configuration and comprises a configuration that can be derived using the methods, equations and protocols set forth above. This minimally converging-diverging configuration generates slightly supersonic flow at exit 62 and is well suited to overcome the drag rise that an aircraft encounters when traveling at transonic speeds.

The relative outboard pivotal movement of the aft end of each sleeve segment 68 causes the aft end of each sleeve segment 68 to move circumferentially away from one another. At the same time, the relative inboard pivotal movement of the forward-most end of each sleeve segment 68 causes the forward-most end of each sleeve segment 68 to move circumferentially towards one another. Accordingly, when sleeve 66 is disposed in the intermediate position illustrated in FIG. 7, there are now gaps between the aft-most end of each sleeve segment 68. Correspondingly, the gaps that were present between the forward-most ends of sleeve 68 when sleeve 66 was disposed in its aft-most position within nacelle 64 have now diminished.

Figure 8:
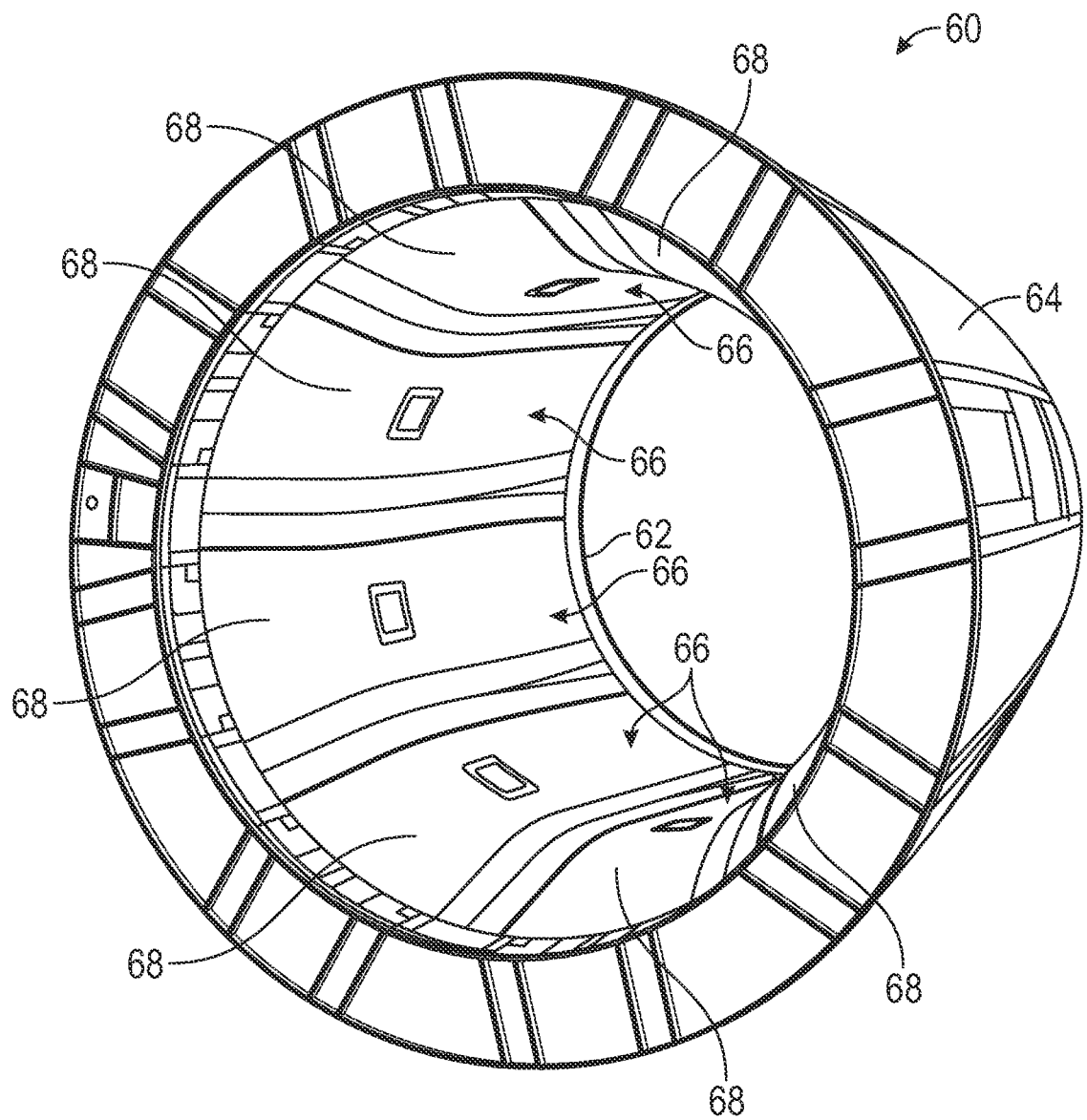
FIG. 8 is a perspective view illustrating the first embodiment of the nozzle assembly arranged in a configuration suitable for a supersonic phase of flight.

With continuing reference to FIGS. 1-7, FIG. 8 is a perspective view illustrating nozzle assembly 60 arranged in a configuration suitable for a supersonic phase of flight. In FIG. 8, sleeve 66 has moved upstream within nacelle 64 to its forward-most location. As sleeve 66 moves upstream into its forward-most location, each sleeve segment 68 is moved by its respective guide (see FIG. 9) in a manner that further alters the inboard and outboard relationship between the forward-most end and the aft-most end of each sleeve segment 68. The guide is configured to cause the aft-most end of each sleeve segment 68 to continue to move in an outboard direction relative to the forward-most end of each sleeve segment 68, and to cause the forward-most end of each sleeve segment 68 to continue to move in an inboard direction relative to the aft-most end of each sleeve segment 68. As before, the primary curve remains the smallest cross-sectional area of sleeve 66. When in the position/configuration illustrated in FIG. 8, there is now a maximum divergence of the pathway that the mass flow follows downstream of the primary curve because of the further change in orientation of each sleeve segment 68. The configuration shown in FIG. 8 is referred to herein as a maximum converging-diverging configuration and comprises a configuration where the area ratio between the aft end of sleeve 66 and the cross-sectional area at the primary curve is the greatest magnitude that can be attained by the guides guiding each sleeve segment 68. This maximum converging-diverging configuration generates high velocity supersonic flow at exit 62 and is well suited to for sustained supersonic flight of aircraft 30.

The further relative outboard pivotal movement of the aft-most end of each sleeve segment 68 causes the aft-most end of each sleeve segment 68 to move circumferentially further away from one another. At the same time, the relative inboard pivotal movement of the forward-most end of each sleeve segment 68 causes the forward-most end of each sleeve segment 68 to move circumferentially further towards one another to the point where the forward-most ends are immediately adjacent to one another and, in some embodiments, in direct contact with one another. Accordingly, when sleeve 66 is disposed in the forward most position illustrated in FIG. 8, the gaps between the aft-most end of each sleeve segment 68 are at their widest while the gaps that were previously present between the forward-most ends of sleeve 68 when sleeve 66 was disposed downstream of its forward-most position within nacelle 64 have now dissipated.

With continuing reference to FIGS. 1-8, FIG. 9 is a torn-away view illustrating a guide 70 of nozzle assembly 60. In the illustrated embodiment, guide 70 is comprised of a forward track 72 and an aft track 74. Forward track 72 and aft track 74 are coupled with nacelle 64 and are configured to guide each sleeve segment 68 as sleeve 66 moves between its forward-most position and its aft-most position. Forward track 72 and aft track 74 are each tilted inboard from the perspective of an upstream direction, with forward track 72 being tilted at a greater angle than aft track 74. A forward portion of sleeve segment 68 is equipped with a track follower 76 that is configured to ride within forward track 72 and to thereby guide the forward end of sleeve segment 68 as it moves forward and aft. Similarly, an aft portion of sleeve segment 68 is equipped with a track follower 78 that is configured to ride within aft track 74 and to thereby guide the aft end of sleeve segment 68 as it moves forward and aft. Because forward track 72 and aft track 74 are tilted inboard at differing angles, the forward and aft ends of sleeve segment 68 move inboard and outboard to greater and lesser extents, respectively, resulting in a relative pivotal motion of the forward end and the aft end of sleeve segment 68 about a central region of sleeve segment 68 as sleeve segment 68 moves forward and aft within nacelle 64. This yields a selectively changeable longitudinal pathway for the mass flow to follow through sleeve 66, the pathway having a longitudinal configuration that varies with the position of sleeve 66 within nacelle 64.

With continuing reference to FIGS. 1-9, FIGS. 10, 11, and 12 are fragmentary, torn-away, cross-sectional views illustrating a portion of nozzle assembly 60 as sleeve 66 moves from an aft-most position to an intermediate position to a forward-most position within nacelle 64. These views illustrate the continuously converging pathway, the minimally converging-diverging pathway, and the maximum converging-diverging pathway that results from positioning sleeve 66 in the aft-most position of FIG. 6, the intermediate position of FIG. 7, and the forward most position of FIG. 8, respectively.

Figure 10:
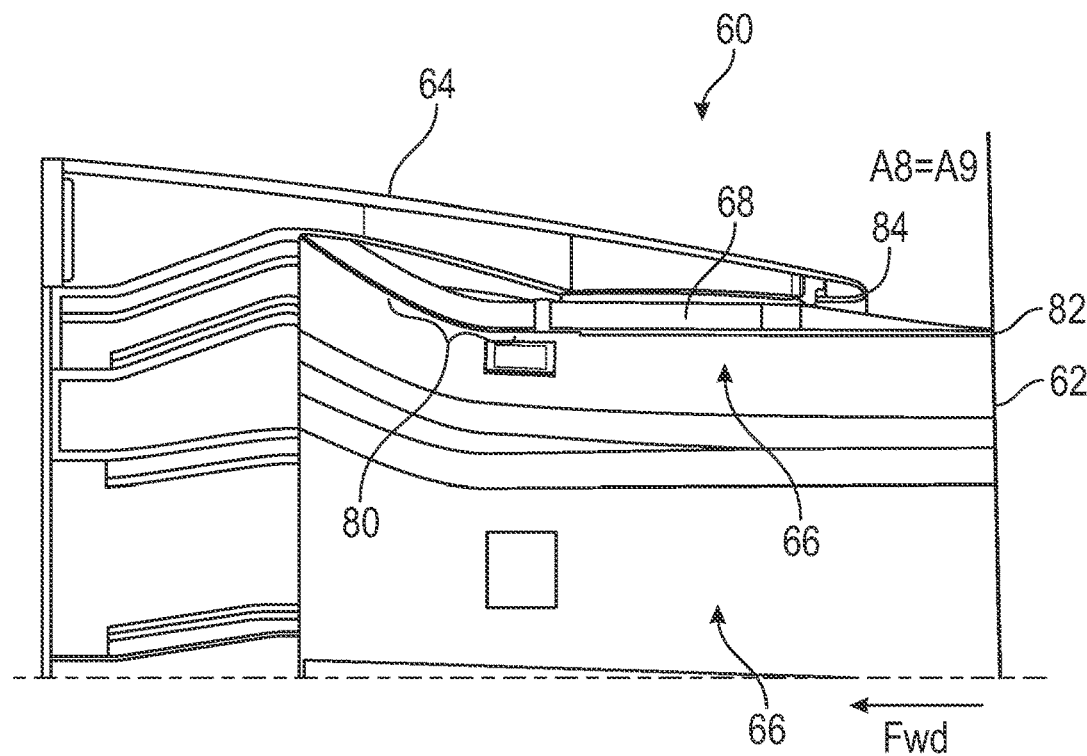
FIG. 10 is a fragmentary, torn-away, cross-sectional view illustrating a portion of the first embodiment of the nozzle assembly arranged in a configuration suitable for the takeoff and landing phase of flight.

FIG. 10 illustrates nozzle assembly 60 with sleeve 66 disposed in the aft-most position. In this view, a primary curve 80 of sleeve segment 68 can best be viewed. The portion of sleeve segment 68 forward of primary curve 80 is diverging in the upstream direction and the portion of sleeve 68 downstream of primary curve 80 is straight. An aft end 82 of sleeve 66 extends beyond an aft end 84 of nacelle 64, making aft end 82 the exit 62 of the propulsion system. As illustrated in FIG. 10, when sleeve 66 is disposed in its aft-most position within nacelle 64, the throat (A8) of nozzle assembly 68 is collocated with the exit plane (A9) of nozzle assembly 68. Because the throat and the exit plane are collocated in the configuration illustrated in FIG. 10, nozzle assembly 60 generates a sub-sonic mass flow when in the illustrated configuration. This makes the illustrated configuration well suited for the take-off and the landing phase of flight.

Figure 11:
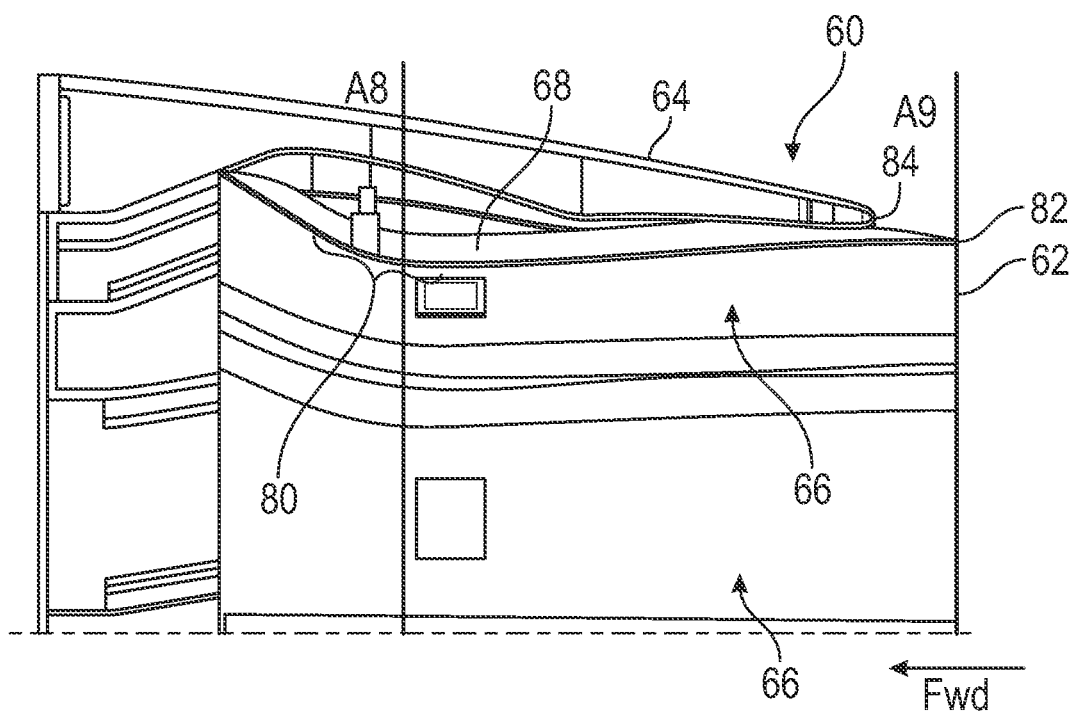
FIG. 11 is a fragmentary, torn-away, cross-sectional view illustrating a portion of the first embodiment of the nozzle assembly arranged in a configuration suitable for the transonic of flight.

FIG. 11 illustrates nozzle assembly 60 with sleeve 66 disposed in the intermediate position as discussed above. Forward track 72 has caused a forward portion of each sleeve segment 68 to move in an inboard direction. Aft track 74 has less of an inboard tilt and consequently the aft end of sleeve segment 68 has moved inboard to a lesser extent than the forward end of sleeve segment 68. This causes a change in longitudinal orientation of each sleeve segment 68 which, in turn, yields a minimally converging-diverging pathway through sleeve 66. Aft end 82 of sleeve 66 continues to extend beyond aft end 84 of nacelle 64, but to a lesser extent than illustrated in FIG. 10 because of the upstream movement of sleeve 66 with respect to nacelle 64. Further, as a result of the inboard pivot of the forward end of sleeve segment 68, the throat (A8) of nozzle assembly 60 is now located at primary curve 80 and the portion of each sleeve segment 68 downstream of primary curve 80 yields a slightly diverging configuration which allows the mass flow to accelerate to supersonic speeds. This configuration is well suited for the transonic phase of flight.

Figure 12:
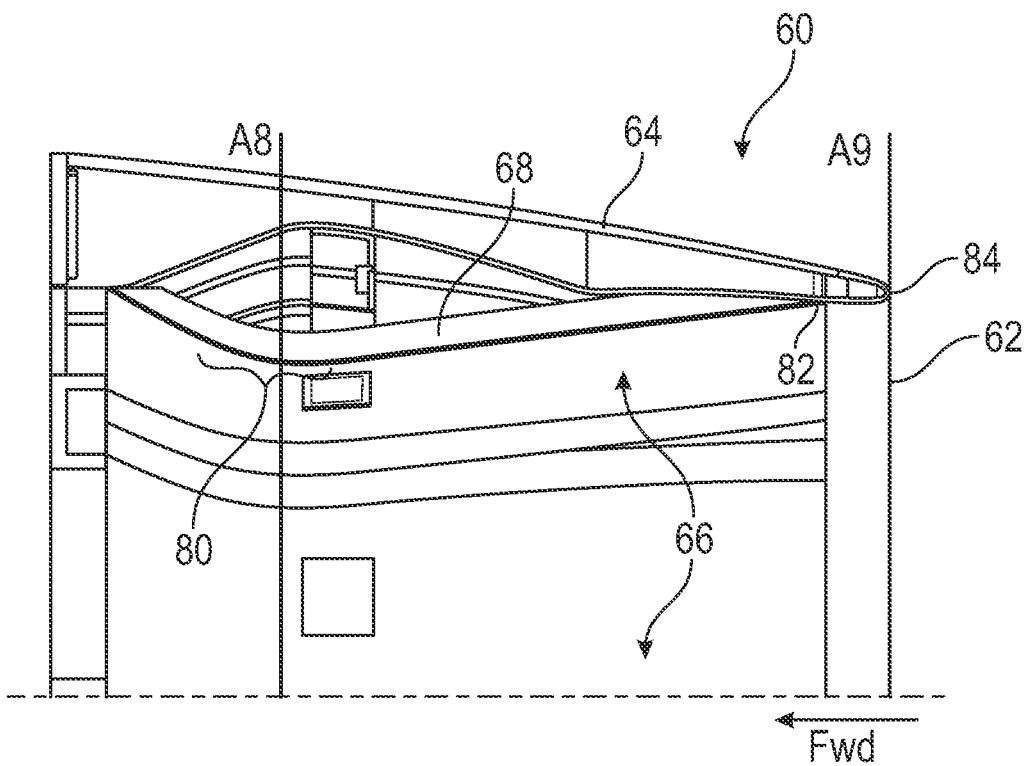
FIG. 12 is a fragmentary, torn-away, cross-sectional view illustrating a portion of the first embodiment of the nozzle assembly arranged in a configuration suitable for the supersonic of flight.
Figure 13:
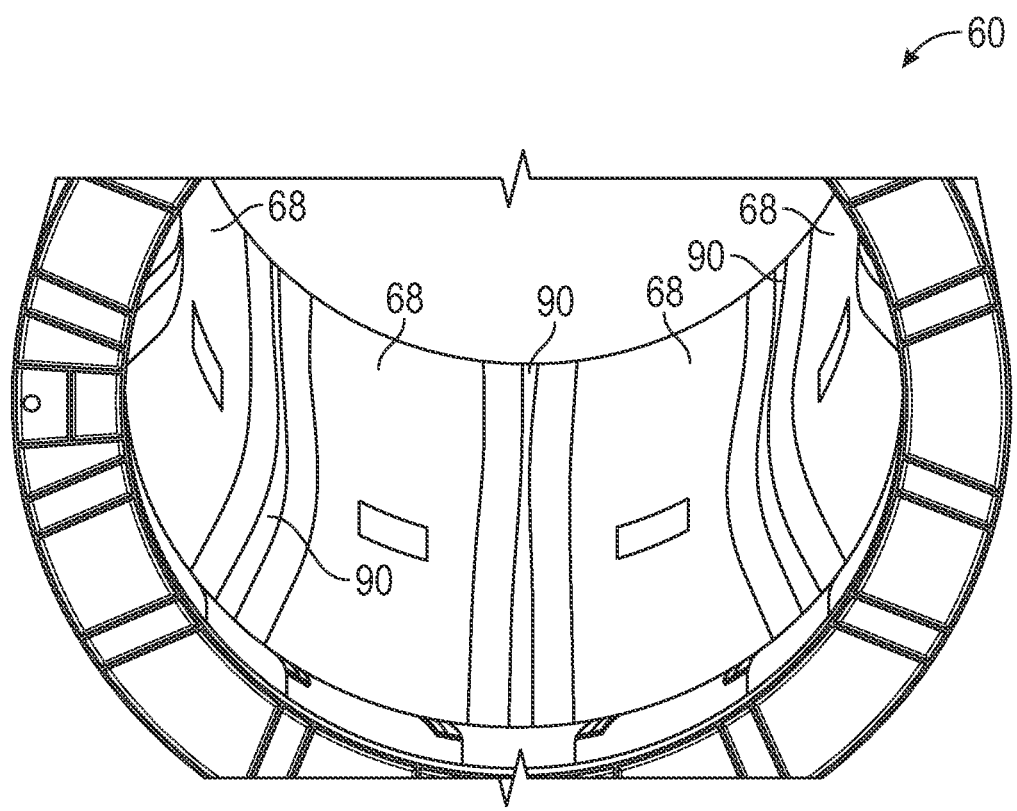
FIG. 13 is a fragmentary view illustrating seals employed by the first embodiment of the nozzle assembly.
Figure 14:
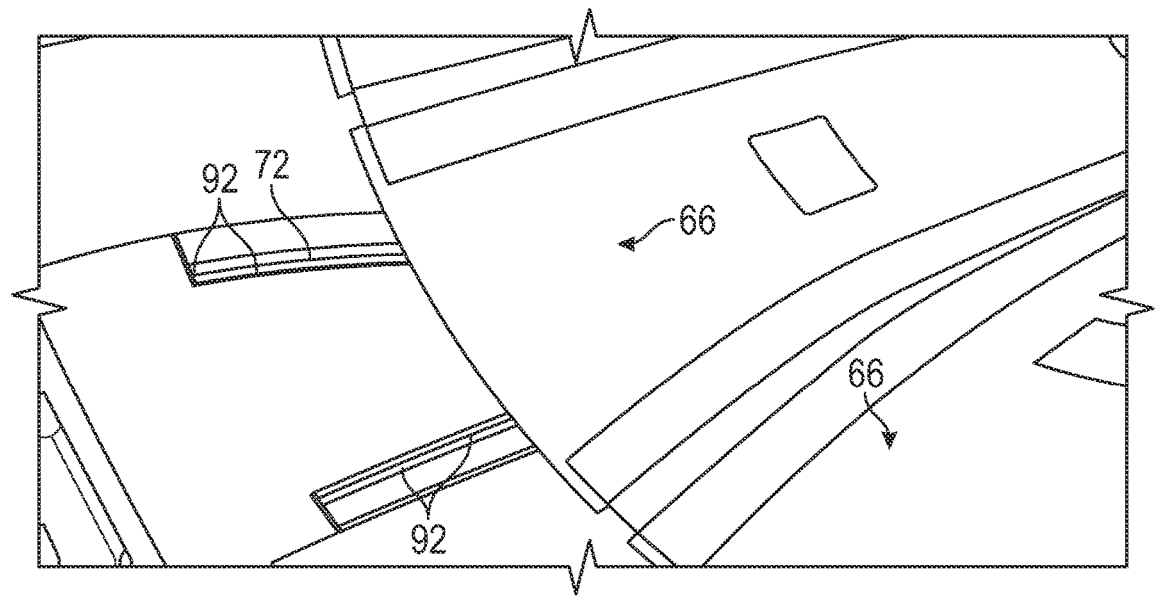
FIG. 14 is a fragmentary view illustrating additional seals employed by the first embodiment of the nozzle assembly.
Figure 15:
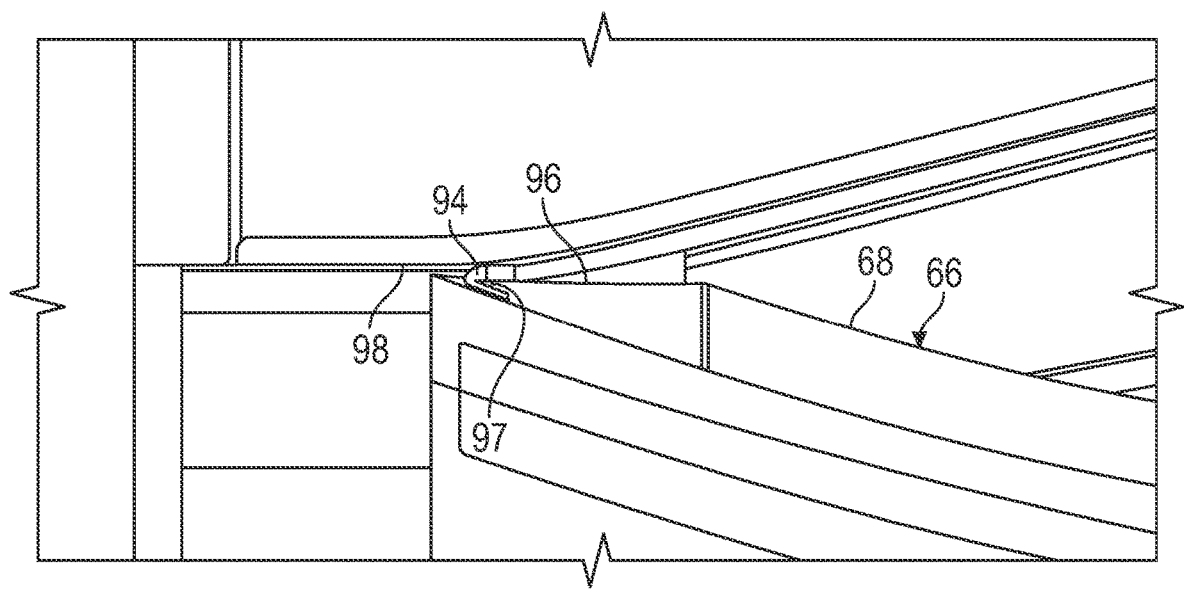
FIG. 15 is a fragmentary torn-away side view illustrating still further seals employed by the first embodiment of the nozzle assembly.

FIG. 12 illustrates nozzle assembly 60 with sleeve 66 disposed in the forward-most position as discussed above. Forward track 72 has caused a forward portion of each sleeve segment 68 to move further in an inboard direction. Aft track 74, which has less of an inboard tilt, has caused the aft end of each sleeve segment 68 to move inboard to a lesser extent. This causes a further change in longitudinal orientation of each sleeve segment 68 which yields a maximum converging-diverging pathway through sleeve 66. Aft end 82 of sleeve 66 now rests within aft end 84 of nacelle 64 and thus aft end 84 of nacelle 64 now comprises exit 62 of the propulsion system. As a result of the further inboard pivot of the forward end of sleeve segment 68, the throat (A8) of nozzle assembly 60 remains located at primary curve 80 and now has a narrowest possible cross-sectional area. The portion of each sleeve segment 68 downstream of primary curve 80 yields an even greater diverging configuration than was present when sleeve 66 was in the intermediate position. This causes an increased ratio between the cross-sectional are of exit 62 and the throat (A8) which is collocated with primary curve 80. This increased ratio allows the mass flow to accelerate to even greater supersonic speeds than was achieved when sleeve 66 resided in the intermediate position. This configuration is well suited for the supersonic phase of flight.

With continuing reference to FIGS. 1-11, FIG. 13 is a fragmentary view illustrating a plurality of seals 90 employed by nozzle assembly 60. Plurality of seals 90 may be made from any material suitable for maintaining its shape/contour when exposed to a mass flow having a temperature imparted by supersonic jet engines. Plurality of seals 90 are configured to engage with lateral ends of sleeve segment 68 and sleeve segments 68 are configured to engage with plurality of seals 90. In an embodiment, there is a tongue-in-groove arrangement between plurality of seals 90 and sleeve segments 68. As the lateral ends of each sleeve segment 68 moves away from the lateral ends of each neighboring sleeve segment 68, plurality of seals 90 are uncovered and serve to obstruct any portion of the mass flow from flowing between the spaced-apart portions of each sleeve segment 68.

In an embodiment, the lateral end portions of each individual segment 68 may be rebated to reduce its thickness. A strip of material may then be coupled to the lateral ends of each individual segment 68 immediately above the rebated portion to form a slot between the strip of material and the lateral end of the individual segment. Then a strip of sealing material may be inserted within the slot of each adjacent pair of individual segments. The slot will have a depth sufficient to accommodate the strip of sealing material (an individual seal 90) when the two individual sleeve segments 68 are pressed up against one another and the strip of sealing material will have a width that is wide enough to prevent the strip of sealing material from coming out of the slot when sleeve segment 68 is in a position that results in a gap between the individual segments 68.

With continuing reference to FIGS. 1-13, FIG. 14 is a fragmentary view illustrating a plurality of seals 92 employed by nozzle assembly 60 to inhibit mass flow from flowing into forward track 72 and aft track 74 if and when forward track 72 and aft track 74 are exposed as a forward or aft end of sleeve 66 passes aft or forward, respectively, of the track. Plurality of seals 92 may be made from any material suitable for maintaining its shape/contour when exposed to a mass flow having a temperature imparted by supersonic jet engines. In an embodiment, there may be two opposing seals positioned in forward track 72 and aft track 74, each opposing seal having a P-shaped configuration. The two opposing seals part ways when track follower 76 and track follower 78, respectively, pass between them and then come back together and press up against each other after the track follower passes by.

With continuing reference to FIGS. 1-14, FIG. 15 is a fragmentary torn-away side view illustrating a seal 94 employed by nozzle assembly 60 to inhibit mass flow from passing between an outer side 96 of a leading edge 97 of each sleeve segment 68 and an inner surface 98 of nacelle 64. Seal 94 may be made from any material suitable for maintaining its shape/contour when exposed to a mass flow having a temperature imparted by supersonic jet engines. In an embodiment, seal 94 is coupled to the leading edge 97 of each sleeve segment 68 and is seated between outer side 96 of leading edge 97 of each sleeve segment 68 and inner surface 98 of nacelle 64. Seal 94 is in sliding engagement with inner surface 98 of nacelle 64 as sleeve 66 moves upstream and downstream through nacelle 64. Seal 94 inhibits direct contact between each individual sleeve segment 68 and inner surface 98 and thereby reduces wear and tear on leading edge 97 of each sleeve segment 68.

With continuing reference to FIGS. 1-15, FIG. 16 is a perspective view illustrating another embodiment of a nozzle assembly 100 made in accordance with the teachings disclosed herein. In this view, nozzle assembly 100 is presented with an exit 102 facing the viewer and oriented in a manner that permits the viewer to look upstream into an aft end of nozzle assembly 100.

Figure 16:
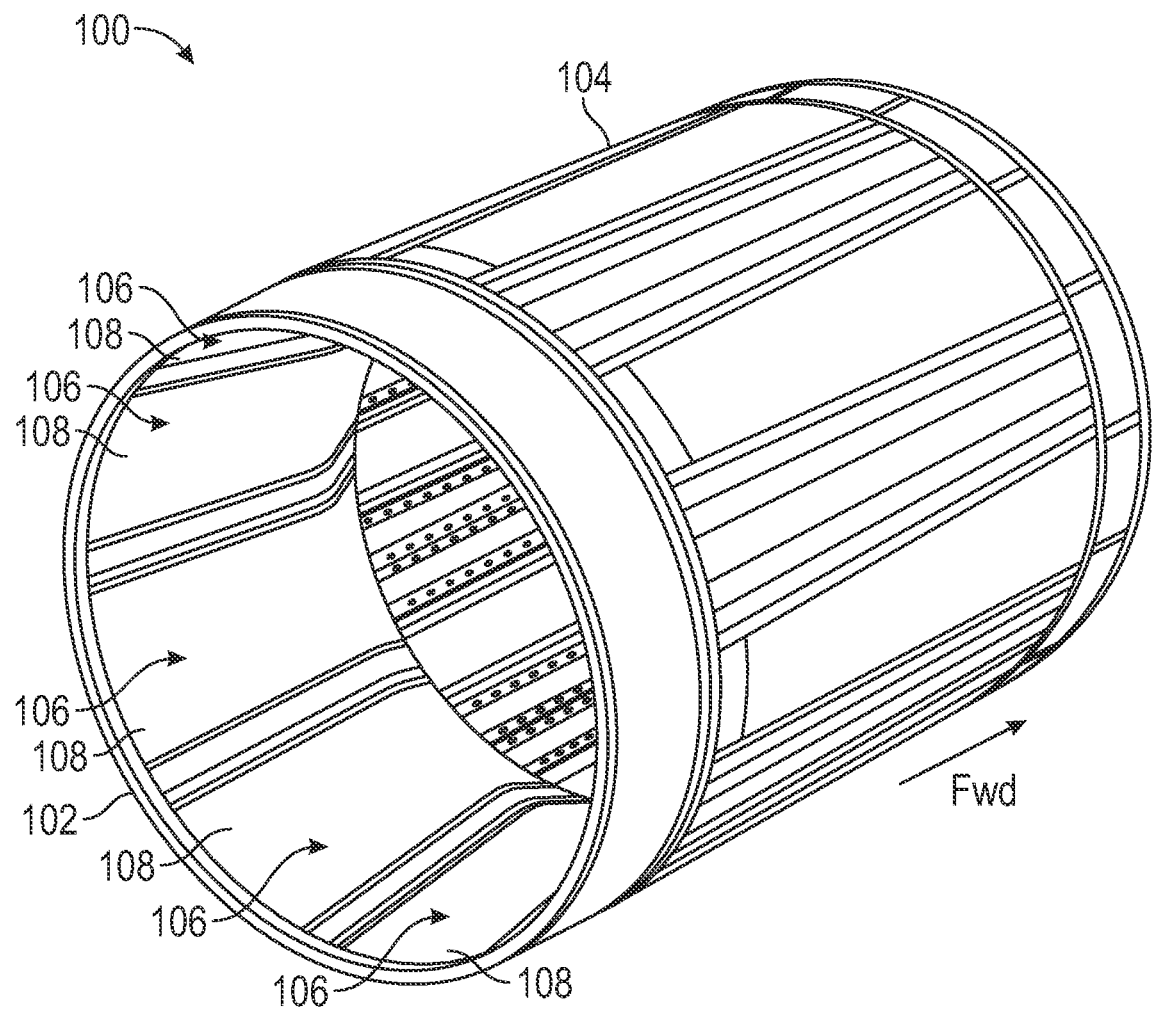
FIG. 16 is a perspective view illustrating a second embodiment of a nozzle assembly made in accordance with the teachings disclosed herein viewed in an upstream direction.
Figure 17:
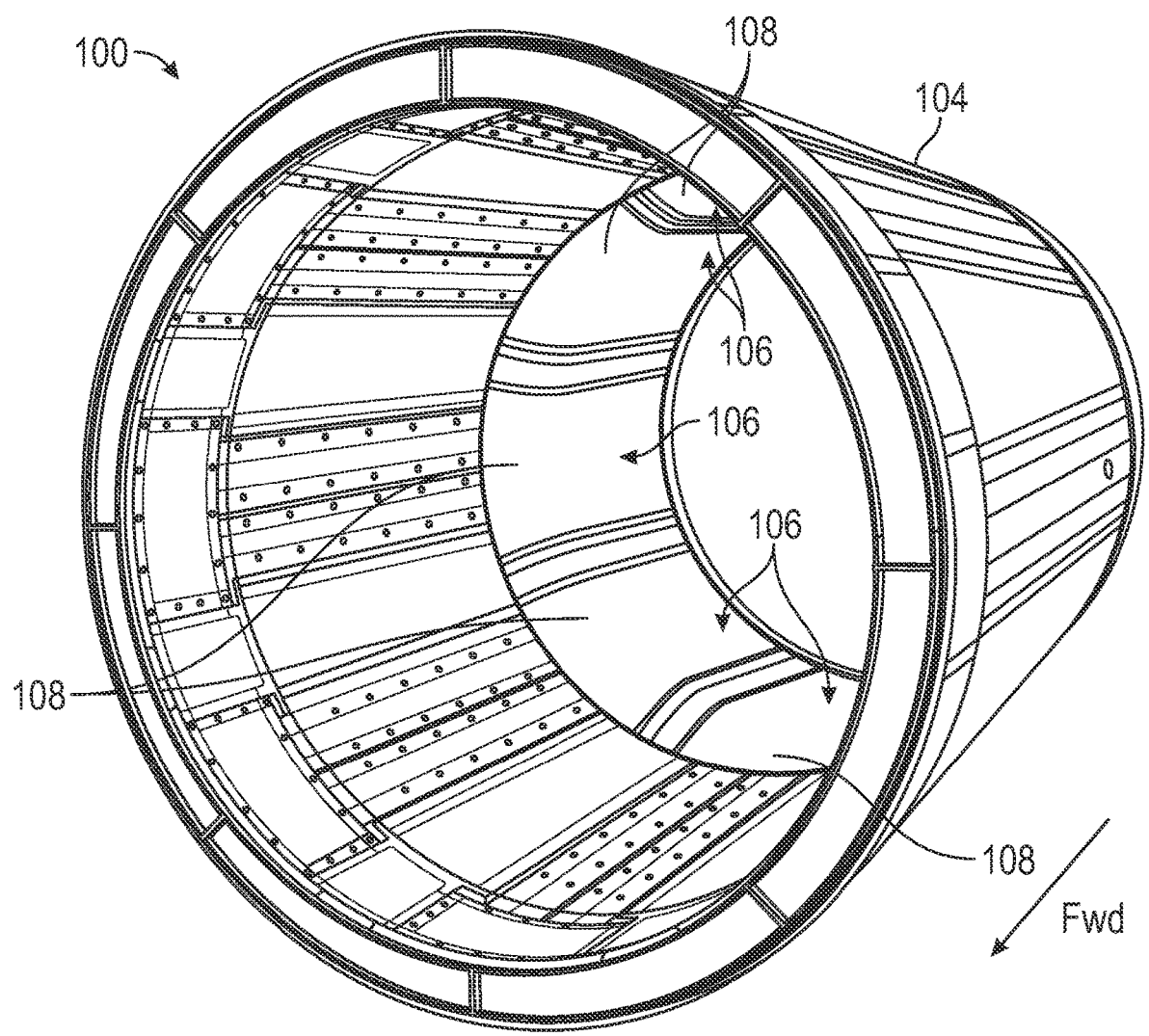
FIG. 17 is a perspective view illustrating the second embodiment of the nozzle assembly viewed in a downstream direction.
Figure 18:
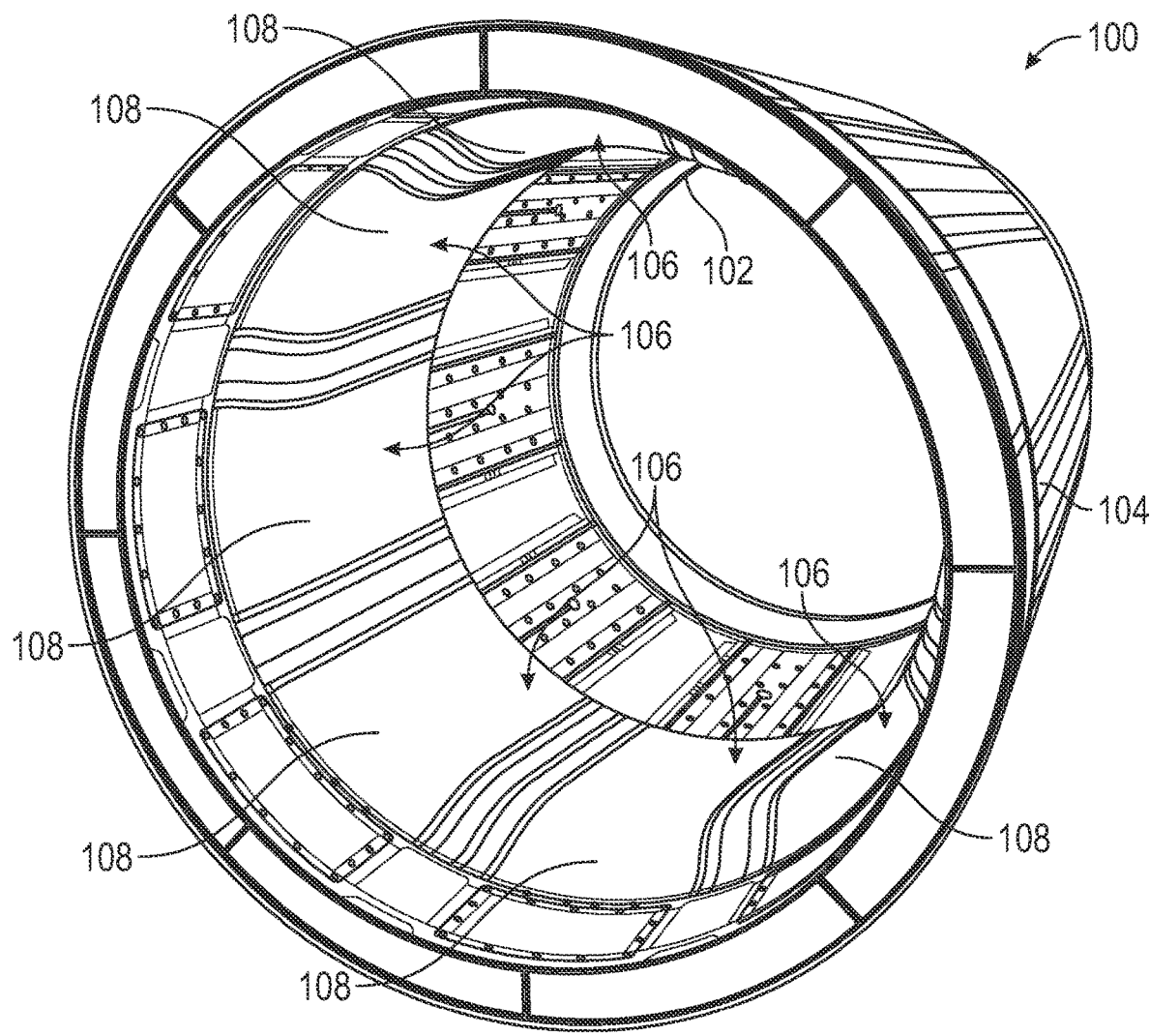
FIG. 18 is a perspective view illustrating the second embodiment of the nozzle assembly arranged in a configuration suitable for a takeoff, a landing, and a transonic phase of flight.

Nozzle assembly 100 includes a nacelle 104 and a sleeve 106 mounted therein and coupled in a manner that permits sleeve 106 to translate forward and aft within nacelle 104. Sleeve 106 is comprised of a plurality of individual, substantially identical, sleeve segments 108 aligned longitudinally with one another, oriented such that their longitudinal axes are aligned with the mass flow, and arranged circumferentially to form an annular, tube-like structure that, together with an internal surface of nacelle 104, is configured to guide the mass flow through nozzle assembly 100 to exit 102. In FIG. 16, sleeve 106 is disposed in an aft-most position within nacelle 104. In FIG. 16, the controller and the actuator of nozzle assembly 100 are not visible and may be mounted to any suitable location on the aircraft.

With continuing reference to FIGS. 1-16, FIG. 17 is a perspective view illustrating nozzle assembly 100 viewed in a downstream direction. In FIG. 17, sleeve 106 is again illustrated in an aft-most position. In both FIGS. 16 and 17, it can be observed that both lateral ends of each individual sleeve segment 108 is disposed immediately adjacent to one another. This is a result sleeve 106 being disposed at a downstream end of nacelle 104 where a diameter of nacelle 104 is at its smallest which causes sleeve 106 to, correspondingly, contract to its smallest diameter.

With continuing reference to FIGS. 1-17, FIG. 18 is a perspective view illustrating nozzle assembly 100 arranged in a configuration that is suitable for a takeoff, a landing, and also a transonic phase of flight. In this configuration, sleeve 106 is disposed in its forward-most position. Both lateral ends of each sleeve segment 108 is spaced part from the lateral ends of each of its neighboring sleeve segment 108. As discussed below, this is because the plurality of guides that guide each individual sleeve segment 108 guides both the forward portion and the aft portion of each sleeve segment 108 in parallel directions along an internal surface of a frusto-conical shaped portion of nacelle 104. At a forward end of nacelle 104, where the diameter and cross-sectional area of nacelle 104 is the greatest, the diameter and cross-sectional area of sleeve 106 is correspondingly the greatest. To accommodate this increased diameter, the individual sleeve segments 108 necessarily move laterally away from one another. In this configuration, a primary curve (see FIGS. 20-22) of each individual sleeve segment 108 forms the smallest cross-sectional area of sleeve 106. The longitudinal cross-section of sleeve 106 upstream of the primary curve has a diverging contour in the upstream direction and, in the downstream direction, aft of the primary curve, it again has a diverging contour. Downstream of sleeve 106, the internal surface of nacelle 104 has a converging configuration. At the primary curve or throat of sleeve 106, the diameter is greater than the diameter of exit 102. Thus, in the configuration illustrated in FIG. 18, the mass flow passing through nacelle 104 follows a pathway that will converge when the mass flow initially encounters sleeve 106 until reaching the primary curve, and then will diverge until it exits sleeve 106. At that point, the mass flow will encounter the internal surface of nacelle 104 which will again cause the mass flow to continuously converge until reaching exit 102. In this configuration, the mass flow is precluded from becoming supersonic because, with sleeve 106 in the forward-most position, the diameter of the throat (i.e., the narrowest portion of sleeve 106 which is collocated with the primary curve) is not less than the diameter of exit 102. This configuration is well suited for taking off and for landing an aircraft because the lack of supersonic flow ensures that the noise generated by the propulsion system will be relatively low and in compliance with local ordinances and governing law. This configuration is also well suited for transonic flight because it moves at sonic speeds and therefore it avoids shocks and separated flow which may be inadvertently caused if the flow became supersonic and then was forced through a section with a converging area.

Figure 19:
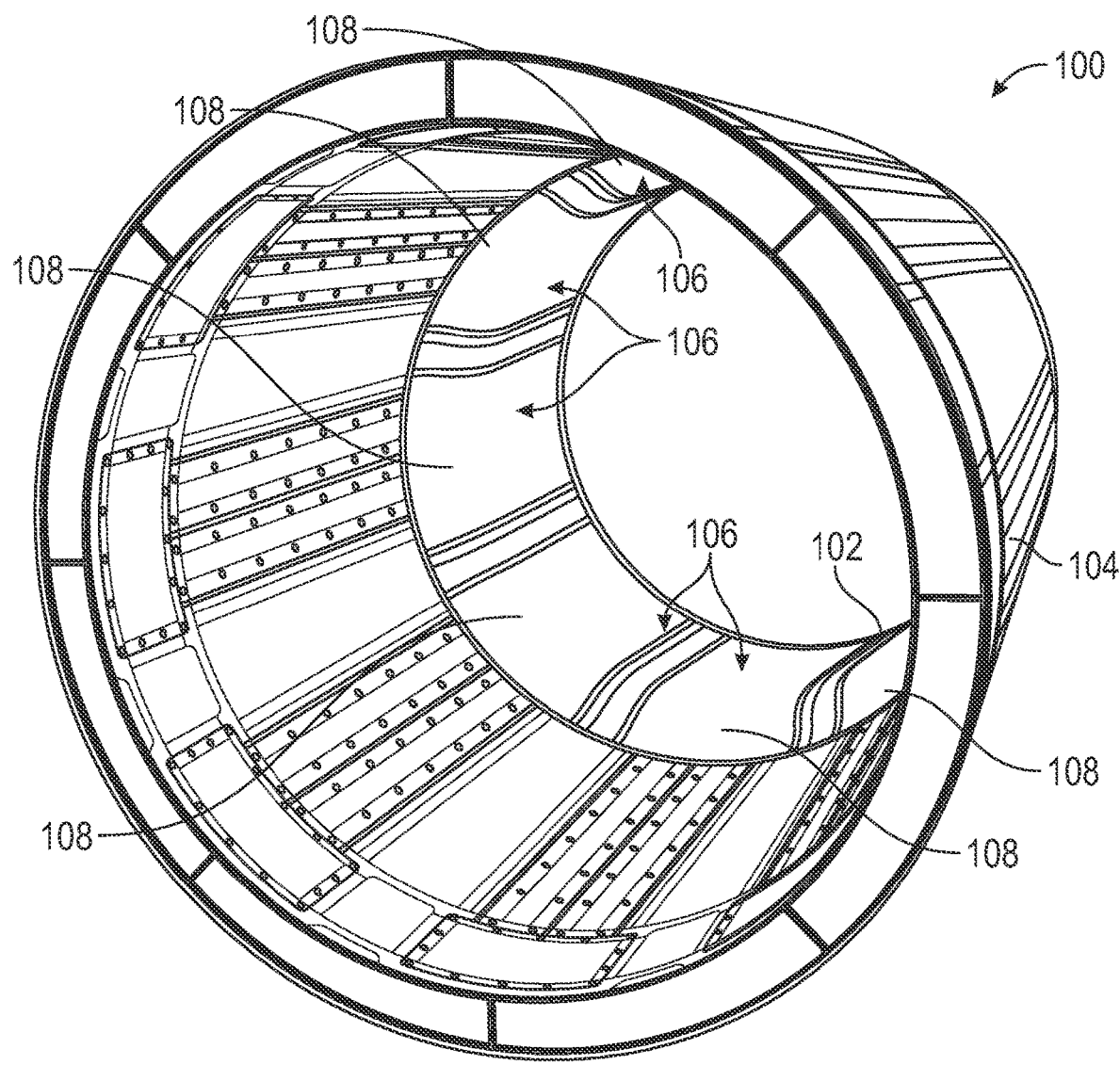
FIG. 19 is a perspective view illustrating the second embodiment of the nozzle assembly arranged in a configuration suitable for a supersonic phase of flight.
Figure 20:
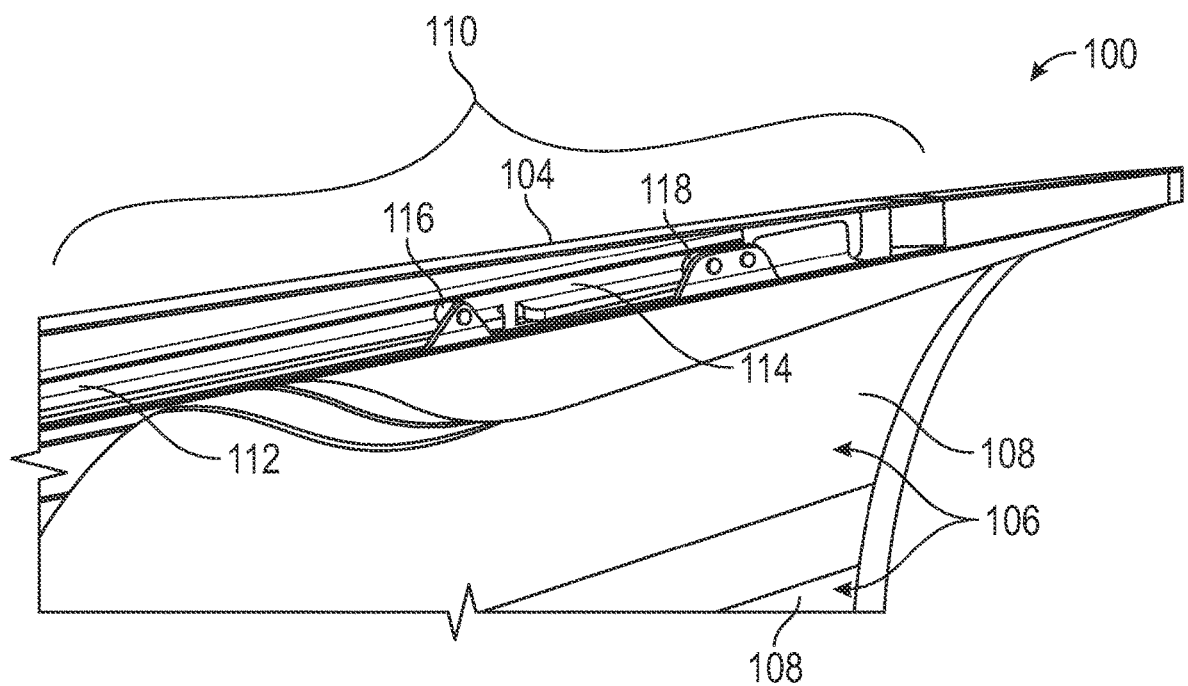
FIG. 20 is a torn-away view illustrating internal features of the second embodiment of the nozzle assembly.

With continuing reference to FIGS. 1-18, FIG. 19 is a perspective view illustrating nozzle assembly 100 arranged in a configuration suitable for a supersonic phase of flight. In FIG. 19, sleeve 106 has moved downstream with nacelle 104 to its aft-most location. As sleeve 106 moves downstream towards its aft-most position, each sleeve segment 108 is moved by its respective guide (see FIG. 20) in a manner that circumferentially contracts sleeve 106 by bringing each individual sleeve segment 108 laterally closer to its neighboring sleeve segment. When sleeve 106 reaches its aft-most position, each sleeve segment 108 is disposed immediately adjacent to and, in an embodiment, into direct contact with one another. The guide is configured to move a front portion of each sleeve segment 108 and a rear portion of sleeve segment 108 in parallel directions such that sleeve 106 translates between its forward-most position and its aft-most position without altering the longitudinal orientation of any individual sleeve segment 108. As before, the primary curve remains the smallest cross-sectional area of sleeve 106. However, when sleeve 106 is in the position/configuration illustrated in FIG. 19, the cross-sectional diameter of the throat of sleeve 106 (as defined by its primary curve) has contracted as compared with its cross-sectional diameter in the forward-most position and thus there is now divergence between the cross-sectional diameter of the throat of sleeve 106 and the cross-sectional area of exit 102. This contraction of the throat of sleeve 106, and hence this divergence between the throat of sleeve 106 and exit 102 first arises when sleeve 106 begins to move aft from its forward-most position towards an aft end of nacelle 104. When sleeve 106 reaches its aft-most position, the divergence between the throat of sleeve 106 and exit 102 reaches its greatest magnitude. Accordingly, the configuration shown in FIG. 19 is referred to herein as a maximum converging-diverging configuration and comprises a configuration where the area ratio between exit 102 and the cross-sectional area at the primary curve (i.e., the throat of sleeve 106) is the greatest magnitude that can be attained by the guides guiding each sleeve segment 108. This maximum converging-diverging configuration generates high velocity supersonic flow at exit 102 and is well suited to for sustained supersonic flight of aircraft 30.

With continuing reference to FIGS. 1-19, FIG. 20 is a torn-away view illustrating a guide 110 of nozzle assembly 100. In the illustrated embodiment, guide 110 is comprised of a forward track 112 and an aft track 114. Forward track 112 and aft track 114 are coupled with nacelle 104 and are configured to guide each sleeve segment 108 as sleeve 106 moves between its forward-most position and its aft-most position. Forward track 112 and aft track 114 are each generally parallel with an internal surface of nacelle 104. A forward portion of sleeve segment 108 is equipped with a track follower 116 that is configured to ride within forward track 112 and to thereby guide the forward end of sleeve segment 108 as it moves forward and aft. Similarly, an aft portion of sleeve segment 108 is equipped with a track follower 118 that is configured to ride within aft track 114 and to thereby guide the aft end of sleeve segment 108 as it moves forward and aft. Because forward track 112 and aft track 114 are parallel and arranged in tandem, the forward and aft ends of sleeve segment 108 move neither inboard nor outboard with respect to one another as sleeve 106 moves between the forward-most position and the aft-most position. As sleeve 106 moves forward and aft within nacelle 104, sleeve 106 expands and contracts, respectively, due to the contours of nacelle 104. This yields a pathway through sleeve 106 and through nacelle 104 that has a variable throat. This, in turn, yields a selectively controllable mass flow velocity having a speed that varies in correspondence with the position of sleeve 106 within nacelle 104.

With continuing reference to FIGS. 1-20, FIGS. 21 and 22 are fragmentary, torn-away, cross-sectional view illustrating a portion nozzle assembly 100 as sleeve 106 moves from a forward-most position to an aft-most position within nacelle 104. These views illustrate the continuously converging pathway and the maximum converging-diverging pathway that results from positioning sleeve 106 in the forward-most position of FIG. 21 and the aft-most position of FIG. 22, respectively.

Figure 21:
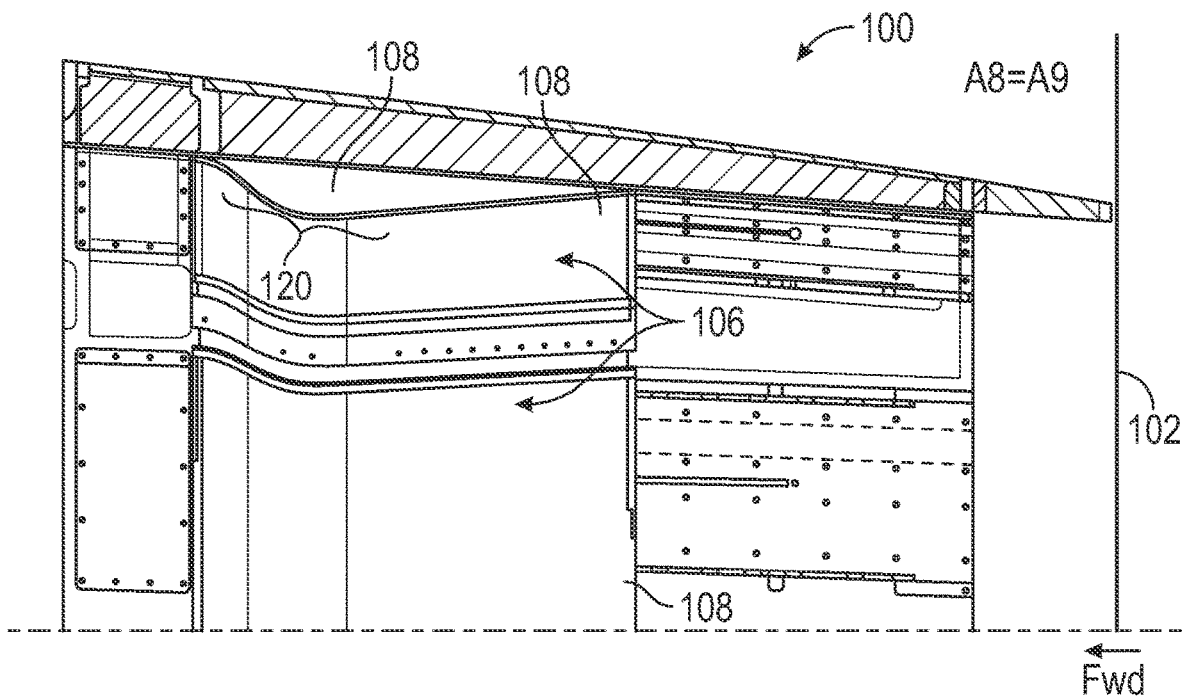
FIG. 21 is a fragmentary, torn-away, cross-sectional view illustrating a portion of the second embodiment of the nozzle assembly arranged in a configuration suitable for the takeoff, landing, and transonic phase of flight.

FIG. 21 illustrates nozzle assembly 100 with sleeve 106 disposed in the forward-most position. In this view, a primary curve 120 of sleeve segment 108 can best be viewed. The portion of sleeve segment 108 forward of primary curve 120 is diverging in the upstream direction and the portion of sleeve 108 downstream of primary curve 120 is diverging in the downstream direction. When sleeve 106 is disposed in its forward-most position within nacelle 104, the narrowest cross-sectional area of sleeve 106 as defined by primary curve 120 has a cross-sectional dimension that is greater than the cross-sectional area of exit 102. Therefore, when sleeve 106 is disposed in the forward most position, the throat (A8) of nozzle assembly 108 is collocated with the exit plane (A9) of nozzle assembly 108. This yields a mass flow that remains subsonic as it travels through nozzle assembly 100. Such sub-sonic flow is well suited for the take-off and the landing phase of flight. In addition, because the subsonic flow is near transonic speeds, the configuration illustrated in FIG. 21 is also well suited for the transonic phase of flight.

Figure 22:
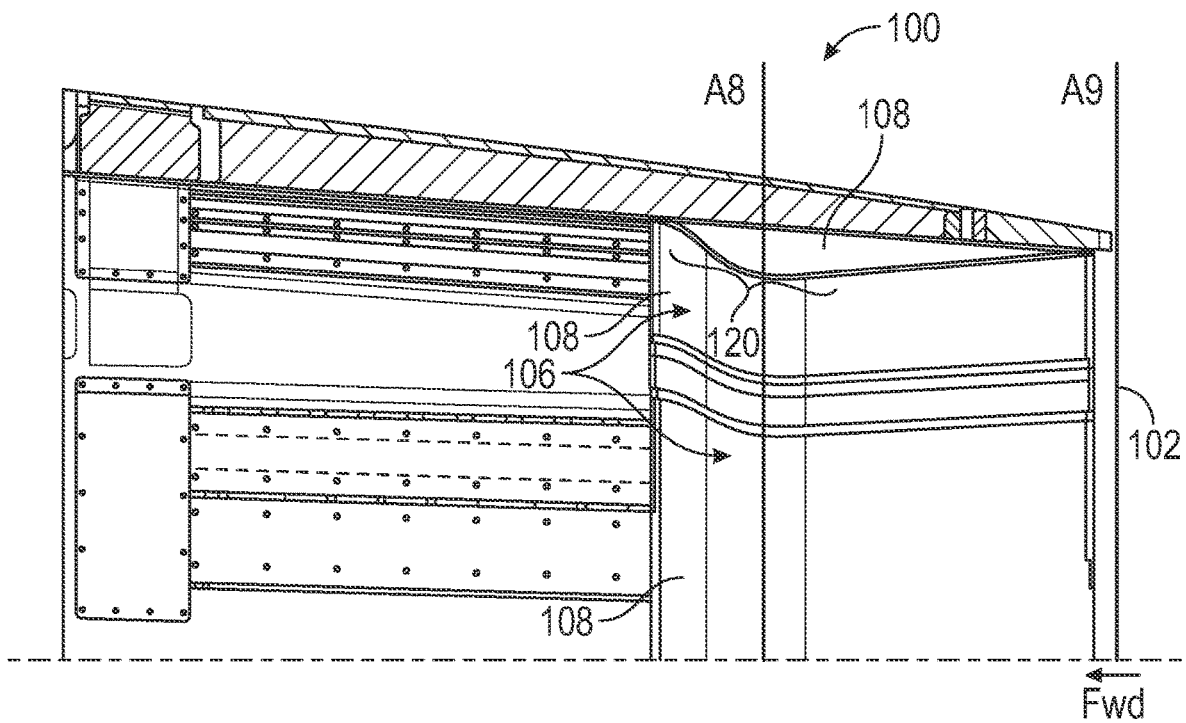
FIG. 22 is a fragmentary, torn-away, cross-sectional view illustrating a portion of the second embodiment of the nozzle assembly arranged in a configuration suitable for the supersonic of flight.
Figure 23:
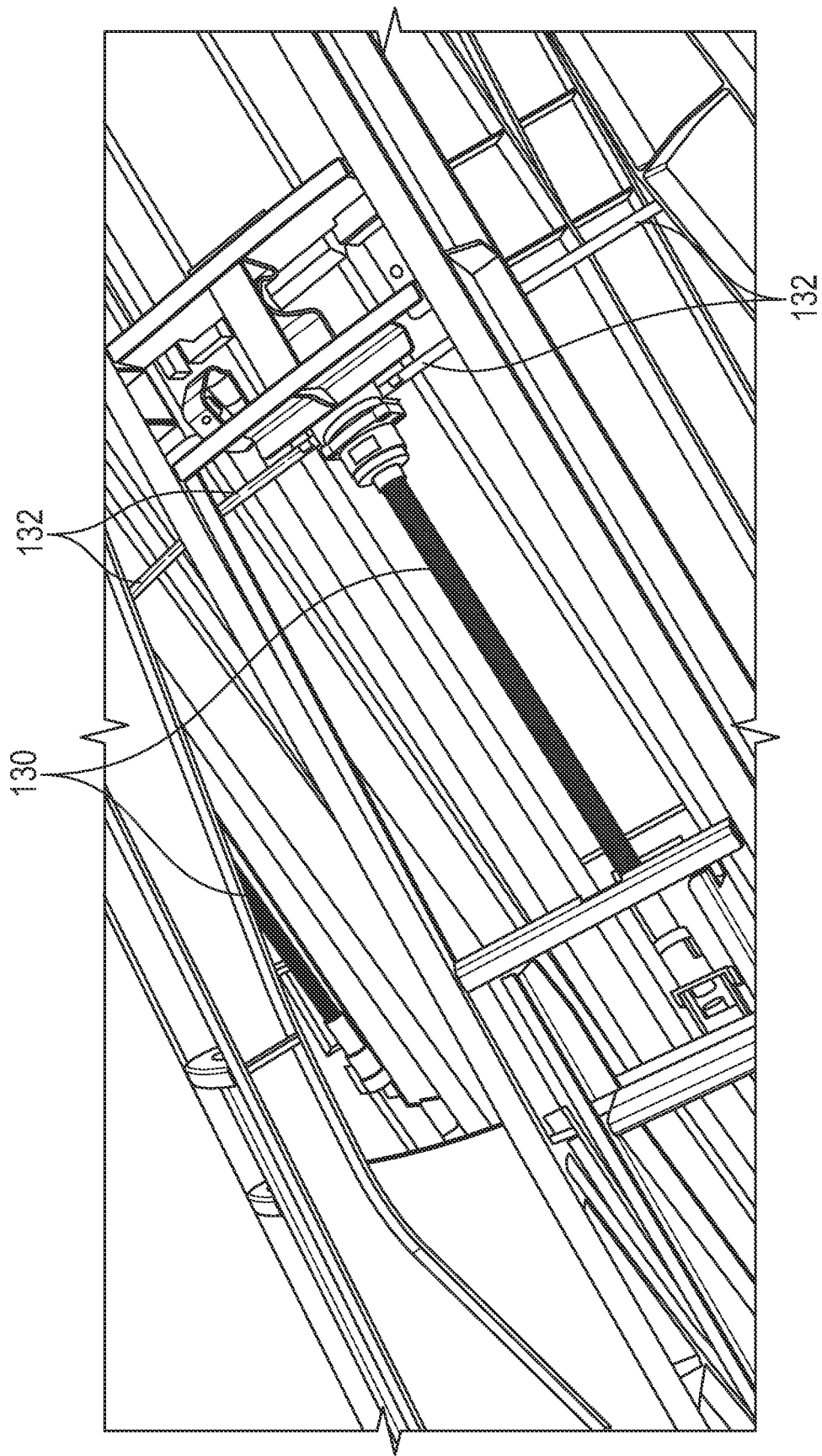
FIG. 23 is a fragmentary, torn-away perspective view of a non-limiting embodiment of an actuator suitable for use with the first embodiment of the nozzle assembly and the second embodiment of the nozzle assembly.

FIG. 22 illustrates nozzle assembly 100 with sleeve 106 disposed in the aft-most position where sleeve 106 is contracted to the maximum extent possible. The cross-sectional area of sleeve 106 at the primary curve 120 is now at its smallest possible magnitude. Correspondingly, the throat (A8) of nozzle assembly 100 is now located at primary curve 120. The portion of each sleeve segment 108 upstream of primary curve 120 converges in the downstream direction and the portion of sleeve segment 108 downstream of primary curve 120 diverges in the downstream direction, yielding a converging-diverging configuration for sleeve 106 and nozzle assembly 100 that allows the mass flow to reach supersonic speeds at exit 102. Accordingly, this configuration is well suited for the supersonic phase of flight.

The discussion above pertaining to plurality of seals 90, plurality of seals 92, plurality of seals 94 with respect to nozzle assembly 60 applies with equal force and to the same extent to nozzle assembly 100. For the sake of brevity, that discussion will not be repeated here. In other embodiments of the nozzle assembly disclosed herein, any other suitable seal or plurality of seals that is/are effective to inhibit mass flow leakage as it moves through the nozzle assembly may be used without deviating from the teachings of the present disclosure.

With continuing reference to FIGS. 1-22, FIG. 23 is a fragmentary, torn-away perspective view of an actuator 130 suitable for use with nozzle assembly 60, nozzle assembly 100, and with any other nozzle assembly made in accordance with the teachings disclosed herein. Actuator 130 is configured to move sleeve 66, sleeve 106, or any other sleeve made in accordance with the teachings disclosed herein between the various longitudinal positions within nacelle 62 and nacelle 102 as discussed above.

In the illustrated embodiment, actuator 130 comprises a plurality of ball screw drives. However, it should be understood that any actuator that is effective to move sleeve 66, sleeve 106, or any other sleeve made in accordance with the teachings disclosed herein may be employed without departing from the teachings of the present disclosure. Each ball screw drive receives torque from a segmented flex shaft 132 that extends around an entire circumference of the nozzle assembly. By using a single source of torque to drive each individual ball screw drive, each ball screw drive will move in unison with one another.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

The invention claimed is:

1. A nozzle assembly for use with a propulsion system of an aircraft, the propulsion system including an engine, the engine configured to produce a mass flow, the nozzle assembly comprising:
   a nacelle;
   a sleeve mounted within the nacelle downstream of the engine, the sleeve configured to move between a forward position and an aft position within the nacelle and further configured to receive the mass flow from the engine and to guide the mass flow to an exit of the propulsion system, the sleeve comprised of a plurality of sleeve segments, each sleeve segment of the plurality of sleeve segments aligned longitudinally and disposed in a circumferential arrangement to form the sleeve;
   a plurality of guides, each guide of the plurality of guides coupled with a sleeve segment of the plurality of sleeve segments, each guide configured to direct a movement of each sleeve segment as the sleeve moves between the forward position and the aft position; and
   an actuator coupled with the sleeve and configured to move the sleeve between the forward position and the aft position;
   wherein an internal surface of each sleeve segment cooperates with one another to define a pathway that guides the mass flow through the sleeve,
   wherein the pathway together with an internal surface of the nacelle has a longitudinal contour that varies as the sleeve moves between the forward position and the aft position,
   wherein an upstream portion of the plurality of sleeve segments move circumferentially together and a downstream portion of the plurality of sleeve segments move circumferentially apart as the sleeve moves between the forward position and the aft position in a first direction, and
   wherein the upstream portion of the plurality of sleeve segments move circumferentially apart and the downstream portion of the plurality of sleeve segments move circumferentially together as the sleeve moves between the forward position and the aft position in a second direction.

2. The nozzle assembly of claim 1, wherein each sleeve segment has a same planform.

3. The nozzle assembly of claim 1, wherein the plurality of guides comprises a plurality of tracks, and wherein the nozzle assembly further comprises a plurality of track followers, each track follower of the plurality of track followers coupled at a first end with a corresponding track and at a second end with a corresponding sleeve segment.

4. The nozzle assembly of claim 3, wherein the plurality of guides is coupled with the internal surface of the nacelle.

5. The nozzle assembly of claim 3, wherein each corresponding sleeve segment is coupled with two of the track followers.

6. The nozzle assembly of claim 5, wherein the two track followers are coupled with the corresponding sleeve segment at longitudinally spaced apart locations.

7. The nozzle assembly of claim 1, further comprising a plurality of sealing members, each sealing member of the plurality of sealing members disposed in a position to inhibit the mass flow from leaking between two neighboring sleeve segments.

8. The nozzle assembly of claim 1, further comprising a plurality of sealing members, each sealing member of the plurality of sealing members disposed in a position to inhibit the mass flow from leaking between the sleeve and an inner surface of the nacelle.

9. The nozzle assembly of claim 1, further comprising a plurality of sealing members, each sealing member of the plurality of sealing members disposed in a position to inhibit the mass flow from leaking into the plurality of guides.

10. The nozzle assembly of claim 1, wherein each sleeve segment has a contour that includes a primary curve, the primary curve protruding inward towards a center of the circumferential arrangement, all of the primary curves, in aggregate, forming a narrowest cross-sectional area of the sleeve.

11. The nozzle assembly of claim 10, further comprising a controller operatively coupled with the actuator and configured to control the actuator to move the sleeve to a longitudinal position within the nacelle that causes the sleeve together with the internal surface of the nacelle to have a longitudinal configuration corresponding to a phase of flight of the aircraft.

12. The nozzle assembly of claim 11, wherein the controller is configured to control the actuator to move the sleeve to a longitudinal position within the nacelle wherein the sleeve together with the internal surface of the nacelle have a longitudinal cross-sectional configuration that is continuously converging between the narrowest cross-sectional area of the sleeve and the exit when the aircraft is in a take-off and landing phase of flight.

13. The nozzle assembly of claim 11, wherein the controller is configured to control the actuator to move the sleeve to a longitudinal position within the nacelle wherein the sleeve together with the internal surface of the nacelle has a longitudinal cross-sectional configuration that has a minimal converging-diverging configuration when the aircraft is in a transonic phase of flight.

14. The nozzle assembly of claim 11, wherein the controller is configured to control the actuator to move the sleeve to a longitudinal position within the nacelle wherein the sleeve together with an internal surface of the nacelle have a longitudinal cross-sectional configuration that has a maximum converging-diverging configuration when the aircraft is in a supersonic phase of flight.

15. A nozzle assembly for use with a propulsion system of an aircraft, the propulsion system including an engine, the engine configured to produce a mass flow, the nozzle assembly comprising:
 a nacelle;
 a sleeve mounted within the nacelle downstream of the engine, the sleeve configured to move between a forward position and an aft position within the nacelle and further configured to receive the mass flow from the engine and to guide the mass flow to an exit of the propulsion system, the sleeve comprised of a plurality of sleeve segments, each sleeve segment of the plurality of sleeve segments aligned longitudinally and disposed in a circumferential arrangement to form the sleeve;
 a plurality of guides, each guide of the plurality of guides coupled with a sleeve segment of the plurality of sleeve segments, each guide configured to direct a movement of each sleeve segment as the sleeve moves between the forward position and the aft position; and
 an actuator coupled with the sleeve and configured to move the sleeve between the forward position and the aft position;
 wherein an internal surface of each sleeve segment cooperates with one another to define a pathway that guides the mass flow through the sleeve,
 wherein the pathway together with an internal surface of the nacelle have a longitudinal contour that varies as the sleeve moves between the forward position and the aft position,
 wherein the plurality of guides are configured to direct a forward portion of each sleeve segment in a first direction and to direct an aft portion of each sleeve segment in a second direction,
 wherein an upstream portion of the plurality of sleeve segments move circumferentially together and a downstream portion of the plurality of sleeve segments move circumferentially apart as the sleeve moves between the forward position and the aft position in a first direction, and
 wherein the upstream portion of the plurality of sleeve segments move circumferentially apart and the downstream portion of the plurality of sleeve segments move circumferentially together as the sleeve moves between the forward position and the aft position in a second direction.

16. The nozzle assembly of claim 15, wherein an aft end of the sleeve comprises the exit of the propulsion system, and wherein a cross-sectional area of the aft end of the sleeve varies as the sleeve moves from the aft position in an upstream direction.

17. The nozzle assembly of claim 15, wherein the sleeve together with the internal surface of the nacelle has a continuously converging longitudinal cross-sectional configuration when the sleeve is in the aft position and a maximum converging-diverging longitudinal cross-sectional configuration when the sleeve is in the forward position.

18. The nozzle assembly of claim 17, wherein the plurality of guides are configured to direct the forward portion of each sleeve segment circumferentially inward in the first direction such that a first distance between the forward portion of each neighboring sleeve segment is reduced as the sleeve moves from the aft position to the forward position and to direct the aft portion of each sleeve segment circumferentially inward in the second direction such that a second distance between the aft portion of each neighboring sleeve segment is increased as the sleeve moves from the aft position to the forward position.

19. The nozzle assembly of claim 15, further comprising a controller operatively coupled with the actuator and configured to control the actuator.

20. The nozzle assembly of claim 15, wherein an aft end of the sleeve protrudes beyond an aft end of the nacelle when the sleeve is in the aft position.

* * * * *